United States Patent
Dikici et al.

(10) Patent No.: US 12,229,949 B2
(45) Date of Patent: Feb. 18, 2025

(54) SYSTEMS FOR AUTOMATED LESION DETECTION AND RELATED METHODS

(71) Applicant: Ohio State Innovation Foundation, Columbus, OH (US)

(72) Inventors: Engin Dikici, Dublin, OH (US); Luciano Prevedello, Dublin, OH (US); Matthew Bigelow, Hilliard, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 629 days.

(21) Appl. No.: 17/401,536

(22) Filed: Aug. 13, 2021

(65) Prior Publication Data
US 2022/0051402 A1 Feb. 17, 2022

Related U.S. Application Data

(60) Provisional application No. 63/065,015, filed on Aug. 13, 2020.

(51) Int. Cl.
*G06T 7/00* (2017.01)
*G06F 18/21* (2023.01)
(Continued)

(52) U.S. Cl.
CPC .......... *G06T 7/0012* (2013.01); *G06F 18/214* (2023.01); *G06F 18/217* (2023.01);
(Continued)

(58) Field of Classification Search
CPC ............... G06T 7/0012; G06T 11/60; G06T 2207/10081; G06T 2207/10088;
(Continued)

(56) References Cited

U.S. PATENT DOCUMENTS 11,222,288 B2   1/2022   Baker
11,475,276 B1  10/2022   Shrivastava et al.
(Continued)

OTHER PUBLICATIONS

L. Nayak, E. Q. Lee, and P. Y. Wen, "Epidemiology of brain metastases," Curr. Oncol. Rep., vol. 14, No. 1, pp. 48-54, 2012.
(Continued)

*Primary Examiner* — Dhaval V Patel
(74) *Attorney, Agent, or Firm* — Meunier Carlin & Curfman LLC

(57) ABSTRACT

Example systems and methods for lesion detection are described herein. An example system includes at least one processor and a memory operably coupled to the at least one processor. The system also includes a candidate selection module configured to receive an image, determine a plurality of candidate points in the image, and select a respective volumetric region centered by each of the candidate points. A portion of a lesion has a high probability of being determined as a candidate point. The system further includes a deep learning network configured to receive the respective volumetric regions selected by the candidate selection module, and determine a respective probability of each respective volumetric region to contain the lesion. Additionally, example methods for training a deep learning network to detect lesions are described herein.

12 Claims, 25 Drawing Sheets

(51) Int. Cl.

| | |
|---|---|
| *G06F 18/214* | (2023.01) |
| *G06F 18/243* | (2023.01) |
| *G06N 3/04* | (2023.01) |
| *G06N 3/045* | (2023.01) |
| *G06N 3/088* | (2023.01) |
| *G06T 11/60* | (2006.01) |
| *G06V 10/20* | (2022.01) |

(52) U.S. Cl.
CPC ............. *G06F 18/243* (2023.01); *G06N 3/04* (2013.01); *G06N 3/045* (2023.01); *G06N 3/088* (2013.01); *G06T 11/60* (2013.01); *G06V 10/255* (2022.01); *G06T 2207/10081* (2013.01); *G06T 2207/10088* (2013.01); *G06T 2207/10104* (2013.01); *G06T 2207/10132* (2013.01); *G06T 2207/30096* (2013.01)

(58) Field of Classification Search
CPC ........... G06T 2207/10104; G06T 2207/10132; G06T 2207/30096; G06T 2207/20081; G06T 2207/20084; G06T 2207/30016; G06F 18/214; G06F 18/217; G06F 18/243; G06N 3/04; G06N 3/045; G06N 3/088; G06N 3/048; G06N 3/08; G06V 10/255; G06V 10/25; G06V 10/26; G06V 10/82; G06V 30/18057; G06V 2201/03
See application file for complete search history.

(56) References Cited

U.S. PATENT DOCUMENTS

| | | | | |
|---|---|---|---|---|
| 11,526,991 | B2* | 12/2022 | Ito | G06V 10/764 |
| 11,826,201 | B2* | 11/2023 | Errico | A61B 8/5223 |
| 2013/0129223 | A1* | 5/2013 | Takacs | G06F 16/583 |
| | | | | 382/195 |
| 2020/0265318 | A1 | 8/2020 | Malkiel et al. | |
| 2020/0380675 | A1* | 12/2020 | Golden | G06T 7/143 |
| 2021/0303933 | A1* | 9/2021 | Kim | G06N 20/20 |
| 2021/0383534 | A1* | 12/2021 | Tadross | G06V 10/764 |
| 2022/0309653 | A1* | 9/2022 | Hassanpour | G06V 10/82 |
| 2022/0335601 | A1* | 10/2022 | Kang | G16H 30/40 |

OTHER PUBLICATIONS

B. C. Yoon, A. F. Saad, P. Rezaii, M. Wintermark, G. Zaharchuk, and M. Iv, "Evaluation of Thick-Slab Overlapping MIP Images of Contrast-Enhanced 3D T1-Weighted CUBE for Detection of Intracranial Metastases: A Pilot Study for Comparison of Lesion Detection, Interpretation Time, and Sensitivity with Nonoverlapping CUBE MIP, CUBE, a," Am. J. Neuroradiol., vol. 39, No. 9, pp. 1635-1642, 2018.

Ú. Pérez-Ramírez, E. Arana, and D. Moratal, "Computer-aided detection of brain metastases using a three-dimensional template-based matching algorithm," in Proc. Annu. Int. Conf. IEEE Eng. Med. Biol. Soc., 2014, pp. 2384-2387.

R. D. Ambrosini, P. Wang, and W. G. O'dell, "Computer-aided detection of metastatic brain tumors using automated three-dimensional template matching," J. Magn. Reson. Imaging, vol. 31, No. 1, pp. 85-93, 2010.

R. Farjam, H. A. Parmar, D. C. Noll, C. I. Tsien, and Y. Cao, "An approach for computer-aided detection of brain metastases in post-Gd T1-W MRI," Magn. Reson. Imaging, vol. 30, No. 6, pp. 824-836, 2012.

S. Yang, Y. Nam, M.-O. Kim, E. Y. Kim, J. Park, and D.-H. Kim, "Computer-aided detection of metastatic brain tumors using magnetic resonance black-blood imaging," Invest. Radiol., vol. 48, No. 2, pp. 113-119, 2013.

H. Khotanlou, O. Colliot, J. Atif, and I. Bloch, "3D brain tumor segmentation in MRI using fuzzy classification, symmetry analysis and spatially constrained deformable models," Fuzzy Sets Syst., vol. 160, No. 10, pp. 1457-1473, 2009.

D. Dera, N. Bouaynaya, and H. M. Fathallah-Shaykh, "Automated robust image segmentation: Level set method using nonnegative matrix factorization with application to brain MRI," Bull. Math. Biol., vol. 78, No. 7, pp. 1450-1476, 2016.

T. Sugimoto, S. Katsuragawa, T. Hirai, R. Murakami, and Y. Yamashita, "Computerized detection of metastatic brain tumors on contrast-enhanced 3D MR images by using a selective enhancement filter," in Proc. World Congr. Med. Phys. Biomed. Eng., 2009, pp. 2070-2072.

Y. LeCun, L. Bottou, Y. Bengio, P. Haffner, and others, "Gradient-based learning applied to document recognition," Proc. IEEE, vol. 86, No. 11, pp. 2278-2324, 1998.

S. Bakas et al., "Identifying the best machine learning algorithms for brain tumor segmentation, progression assessment, and overall survival prediction in the BRATS challenge," arXiv Prepr. arXiv1811. 02629, 2018.

G. Litjens et al., "A Survey on Deep Learning in Medical Image Analysis," Med. Image Anal., vol. 42, 2017.

M. Losch, "Detection and segmentation of brain metastases with deep convolutional networks," M.S. thesis, KTH, Computer Vision and Active Perception, CVAP, 2015.

O. Charron, A. Lallement, D. Jarnet, V. Noblet, J.-B. Clavier, and P. Meyer, "Automatic detection and segmentation of brain metastases on multimodal MR images with a deep convolutional neural network," Comput. Biol. Med., vol. 95, 2018.

K. Kamnitsas et al., "Efficient multi-scale 3D CNN with fully connected CRF for accurate brain lesion segmentation," Med. Image Anal., vol. 36, pp. 61-78, 2017.

Y. Liu et al., "A deep convolutional neural network-based automatic delineation strategy for multiple brain metastases stereotactic radiosurgery," PLoS One, vol. 12, No. 10, p. e0185844, 2017.

B. H. Menze et al., "The multimodal brain tumor image segmentation benchmark (BRATS)," IEEE Trans. Med. Imaging, vol. 34, No. 10, pp. 1993-2024, 2014.

E. Grøvik, D. Yi, M. Iv, E. Tong, D. L. Rubin, and G. Zaharchuk, "Deep learning enables automatic detection and segmentation of brain metastases on multi-sequence MRI," arXiv Prepr. arXiv1903. 07988, 2019.

C. Szegedy et al., "Going deeper with convolutions," in The IEEE Conference on Computer Vision and Pattern Recognition (CVPR), 2015, pp. 1-9.

E. McTyre, J. Scott, and P. Chinnaiyan, "Whole brain radiotherapy for brain metastasis," Surg. Neurol. Int., vol. 4, No. Suppl 4, p. S236, 2013.

T. Lindeberg, "Image matching using generalized scale-space interest points," J. Math. Imaging Vis., vol. 52, No. 1, pp. 3-36, 2015.

T. Lindeberg, "Scale selection properties of generalized scale-space interest point detectors," J. Math. Imaging Vis., vol. 46, No. 2, pp. 177-210, 2013.

C.-P. Yu, G. Ruppert, R. Collins, D. Nguyen, A. Falcao, and Y. Liu, "3D blob based brain tumor detection and segmentation in MR images," in Proc. IEEE 11th Int. Symp. Biomed. Imag., 2014, pp. 1192-1197.

S. Wang and R. M. Summers, "Machine learning and radiology," Med. Image Anal., vol. 16, No. 5, pp. 933-951, 2012.

F. Milletari, N. Navab, and S.-A. Ahmadi, "V-Net: Fully Convolutional Neural Networks for Volumetric Medical Image Segmentation," 2016, pp. 565-571.

A. Dosovitskiy, P. Fischer, J. T. Springenberg, M. Riedmiller, and T. Brox, "Discriminative unsupervised feature learning with exemplar convolutional neural networks," IEEE Trans. Pattern Anal. Mach. Intell., vol. 38, No. 9, pp. 1734-1747, 2015.

O. Ronneberger, P. Fischer, and T. Brox, "U-net: Convolutional networks for biomedical image segmentation," in Proc. Int. Conf. Med. Image Comput. Comput.-Assisted Intervent., 2015, pp. 234-241.

X. Yang et al., "Co-trained convolutional neural networks for automated detection of prostate cancer in multi-parametric MRI," Med. Image Anal., vol. 42, pp. 212-227, 2017.

(56) References Cited

OTHER PUBLICATIONS

J. Duchon, "Splines minimizing rotation-invariant semi-norms in Sobolev spaces," in Constructive theory of functions of several variables, Springer, 1977, pp. 85-100.
M. H. Le et al., "Automated diagnosis of prostate cancer in multi-parametric MRI based on multimodal convolutional neural networks," Phys. Med. Biol., vol. 62, No. 16, p. 6497, 2017.
P. Y. Simard, D. Steinkraus, and J. C. Platt, "Best practices for convolutional neural networks applied to visual document analysis," in Seventh International Conference on Document Analysis and Recognition, 2003. Proceedings., 2003, vol. 1, pp. 958-963.
N. Robitaille, A. Mouiha, B. Crepeault, F. Valdivia, and S. Duchesne, "Tissue-based MRI intensity standardization: Application to multicentric datasets," J. Biomed. Imaging, vol. 2012, p. 4, 2012.
M. Shah et al., "Evaluating intensity normalization on MRIs of human brain with multiple sclerosis," Med. Image Anal., vol. 15, No. 2, pp. 267-282, 2011.
J. D. Christensen, "Normalization of brain magnetic resonance images using histogram even-order derivative analysis," Magn. Reson. Imaging, vol. 21, No. 7, pp. 817-820, 2003.
B. M. Ellingson et al., "Comparison between intensity normalization techniques for dynamic susceptibility contrast (DSC)-MRI estimates of cerebral blood volume (CBV) in human gliomas," J. Magn. Reson. Imaging, vol. 35, No. 6, pp. 1472-1477, 2012.
L. G. Nyúl, J. K. Udupa, and X. Zhang, "New variants of a method of MRI scale standardization," IEEE Trans. Med. Imaging, vol. 19, No. 2, pp. 143-150, 2000.
S. Roy, A. Carass, and J. L. Prince, "Patch based intensity normalization of brain MR images," in Proc. IEEE 10th Int. Symp. Biomed. Imag., 2013, pp. 342-345.
A. Galdran et al., "Data-driven color augmentation techniques for deep skin image analysis," arXiv Prepr. arXiv1703.03702, 2017.
X. Glorot and Y. Bengio, "Understanding the difficulty of training deep feedforward neural networks," in Proc. 13th Int. Conf. Artif. Intell. Statist., 2010, pp. 249-256.
M. Demirer et al., "A user interface for optimizing radiologist engagement in image-data curation for artificial intelligence," Radiol. Artif. Intell. Pap. RYAI-18-0095.
J. Pluim, J. Maintz, and M. Viergever, "Mutual-Information-Based Registration of Medical Images: A Survey," Med. Imaging, IEEE Trans., vol. 22, pp. 986-1004, 2003.
F. Pedregosa et al., "Scikit-learn: Machine learning in Python," J. Mach. Learn. Res., vol. 12, No. Oct, pp. 2825-2830, 2011.
D. Kingma and J. Ba, "Adam: A Method for Stochastic Optimization," Int. Conf. Learn. Represent., 2014.
B. J. Erickson, P. Korfiatis, Z. Akkus, and T. L. Kline, "Machine learning for medical imaging," Radiographics, vol. 37, No. 2, pp. 505-515, 2017.
J. N. van Rijn and F. Hutter, "Hyperparameter importance across datasets," in Proc. 24th ACM SIGKDD Int. Conf. Knowl. Discovery Data Mining, 2018, pp. 2367-2376.
R. K. Srivastava, K. Greff, and J. Schmidhuber, "Training very deep networks," in Advances in neural information processing systems, 2015, pp. 2377-2385.
K. He, X. Zhang, S. Ren, and J. Sun, "Deep residual learning for image recognition," in Proceedings of the IEEE conference on computer vision and pattern recognition, 2016, pp. 770-778.
G. Huang, Z. Liu, L. Van Der Maaten, and K. Q. Weinberger, "Densely connected convolutional networks," in Proceedings of the IEEE conference on computer vision and pattern recognition, 2017, pp. 4700-4708.
J. Deng, W. Dong, R. Socher, L.-J. Li, K. Li, and L. Fei-Fei, "Imagenet: A large-scale hierarchical image database," in 2009 IEEE conference on computer vision and pattern recognition, 2009, pp. 248-255.
K. Weiss, T. M. Khoshgoftaar, and D. Wang, "A survey of transfer learning," J. Big data, vol. 3, No. 1, p. 9, 2016.
M. H. Hesamian, W. Jia, X. He, and P. Kennedy, "Deep Learning Techniques for Medical Image Segmentation: Achievements and Challenges," J. Digit. Imaging, pp. 1-15, 2019.
A. A. Taha and A. Hanbury, "Metrics for evaluating 3D medical image segmentation: Analysis, selection, and tool," BMC Med. Imaging, vol. 15, No. 1, p. 29, 2015.
T. Hastie, R. Tibshirani, and J. Friedman, "Kernel Density Estimation and Classification," in The elements of statistical learning: Data mining, inference, and prediction, Springer, 2009, pp. 208-212.
W. Liu et al., "A survey of deep neural network architectures and their applications," Neurocomputing 234, 11-26, Elsevier (2017) [doi:10.1016/j.neucom.2016.12.038].
D. Shen, G. Wu, and H.-I. Suk, "Deep learning in medical image analysis," Annu. Rev. Biomed. Eng. 19, 221-248, Annual Reviews (2017) [doi:doi:10.1146/annurev-bioeng-071516-044442].
V. Sze et al., "Efficient processing of deep neural networks: A tutorial and survey," Proc. IEEE 105(12), 2295-2329, IEEE (2017) [doi:10.1109/JPROC.2017.2761740].
S. Nass, L. Levit, and L. Gostin, Beyond the HIPAA Privacy Rule: Enhancing Privacy, Improving Health Through Research, in Beyond the HIPAA Privacy Rule: Enhancing Privacy, Improving Health Through Research, The National Academies Press, Washington, DC (2009) [doi:10.17226/12458].
R. C. Petersen et al., "Alzheimer's disease neuroimaging initiative (ADNI): clinical characterization," Neurology 74(3), 201-209, Lippincott Williams and Wilkins (2010) [doi:10.1212/WNL.0b013e3181cb3e25].
L. Oakden-Rayner, "Exploring Large-scale Public Medical Image Datasets," Acad. Radiol. 27(1), 106-112, Elsevier (2019) [doi:10.1016/j.acra.2019.10.006].
K. Clark et al., "The Cancer Imaging Archive (TCIA): maintaining and operating a public information repository," J. Digit. Imaging 26(6), 1045-1057, Springer (2013) [doi:10.1007/s10278-013-9622-7].
P. Dluhos et al., "Multi-center Machine Learning in Imaging Psychiatry: A Meta-Model Approach," Neuroimage 155 (2017) [doi:10.1016/j.neuroimage.2017.03.027].
I. Goodfellow et al., "Generative Adversarial Networks," Adv. Neural Inf. Process. Syst. 3 (2014).
E. Tzeng et al., "Adversarial discriminative domain adaptation," in Proceedings of the IEEE Conference on Computer Vision and Pattern Recognition, pp. 7167-7176 (2017) [doi:10.1109/CVPR.2017.316].
M. Frid-Adar et al., "GAN-based Synthetic Medical Image Augmentation for increased CNN Performance in Liver Lesion Classification," Neurocomputing (2018) [doi:10.1016/j.neucom.2018.09.013].
C. Bowles et al., "GAN augmentation: augmenting training data using generative adversarial networks," arXiv Prepr. arXiv1810.10863 (2018).
C. Han et al., "Combining Noise-to-Image and Image-to-Image GANs: Brain MR Image Augmentation for Tumor Detection," IEEE Access 7, 1 (2019) [doi:10.1109/ACCESS.2019.2947606].
A. Madani et al., "Semi-supervised learning with generative adversarial networks for chest X-ray classification with ability of data domain adaptation," 2018, 1038-1042 [doi:10.1109/ISBI.2018.8363749].
H. Salehinejad et al., "Generalization of Deep Neural Networks for Chest Pathology Classification in X-Rays Using Generative Adversarial Networks," 2018 [doi:10.1109/ICASSP.2018.8461430].
R. Arandjelović and A. Zisserman, "Object discovery with a copy-pasting gan," arXiv Prepr. arXiv1905.11369 (2019).
D. Lee et al., "Context-Aware Synthesis and Placement of Object Instances," in Proceedings of the 32nd International Conference on Neural Information Processing Systems, pp. 10414-10424, Curran Associates Inc., Red Hook, NY, USA (2018) [doi:doi:10.5555/3327546.3327701].
Y. Wang, L. Zhang, and J. Van De Weijer, "Ensembles of generative adversarial networks," arXiv Prepr. arXiv1612.00991 (2016).
E. Dikici et al., "Automated Brain Metastases Detection Framework for T1-Weighted Contrast-Enhanced 3D MRI," IEEE J. Biomed. Heal. Informatics, 1 (Oct. 2020) [doi:10.1109/JBHI.2020.2982103].
X. Wu, K. Xu, and P. Hall, "A survey of image synthesis and editing with generative adversarial networks," Tsinghua Sci. Technol. 22(6), 660-674 (2017) [doi:10.23919/TST.2017.8195348].

(56) References Cited

OTHER PUBLICATIONS

Z. Pan et al., "Recent Progress on Generative Adversarial Networks (GANs): A Survey," IEEE Access pp. 1 (2019) [doi:10.1109/ACCESS.2019.2905015].
X. Yi, E. Walia, and P. Babyn, "Generative Adversarial Network in Medical Imaging: A Review," Med. Image Anal. 58, 101552 (2019) [doi:10.1016/j.media.2019.101552].
X. Wang and A. Gupta, "Unsupervised Learning of Visual Representations Using Videos," in 2015 IEEE International Conference on Computer Vision (ICCV), pp. 2794-2802 (2015) [doi:10.1109/ICCV.2015.320].
R. F. Woolson, "Wilcoxon Signed-Rank Test," in Wiley Encyclopedia of Clinical Trials, pp. 1-3, American Cancer Society (2008) [doi:10.1002/9780471462422.eoct979].
R. Polikar, "Ensemble based systems in decision making," IEEE Circuits Syst. Mag. 6(3), 21-45, IEEE (2006) [doi:10.1109/MCAS.2006.1688199].
O. Sagi and L. Rokach, "Ensemble learning: A survey," Wiley Interdiscip. Rev. Data Min. Knowl. Discov. 8(4), e1249, Wiley Online Library (2018) [doi:10.1002/widm.1249].
L. Theis, A. van den Oord, and M. Bethge, "A note on the evaluation of generative models," in International Conference on Learning Representations (2016).
D. Geman et al., "Visual Turing test for computer vision systems," Proc. Natl. Acad. Sci. U. S. A. 112 (2015) [doi:10.1073/pnas.1422953112].
M. Heusel et al., "GANs trained by a two time-scale update rule converge to a local Nash equilibrium," in Advances in Neural Information Processing Systems 2017—Decem, pp. 6627-6638 (2017) [doi:10.5555/3295222.3295408].
K. Shmelkov, C. Schmid, and K. Alahari, "How good is my GAN?," in The European Conference on Computer Vision (ECCV) (2018).
A. Radford, L. Metz, and S. Chintala, "Unsupervised representation learning with deep convolutional generative adversarial networks," arXiv Prepr. arXiv1511.06434 (2015).
M. J. M. Chuquicusma et al., "How to fool radiologists with generative adversarial networks? a visual turing test for lung cancer diagnosis," in 2018 IEEE 15th international symposium on biomedical imaging (ISBI 2018), pp. 240-244 (2018).
A. Plassard et al., "Learning Implicit Brain MRI Manifolds with Deep Learning," in Proceedings of SPIE—the International Society for Optical Engineering 10574, p. 56 (2018) [doi:10.1117/12.2293515].
T. Hastie, R. Tibshirani, and J. Friedman, "Linear Methods for Regression," in The elements of statistical learning: Data mining, inference, and prediction, pp. 43-94, Springer (2009).
L. van der Maaten and G. Hinton, "Visualizing data using t-SNE," J. Mach. Learn. Res. 9, 2579-2605 (2008).
Araujo, A., Norris, W., Sim, J., 2019. Computing receptive fields of convolutional neural networks. Distill 4, e21.
Dikici, Engin, et al. "Constrained Generative Adversarial Network Ensembles for Sharable Synthetic Data Generation." arXiv preprint arXiv:2003.00086 (submitted Feb. 28, 2020).
Q. Mao et al., "Mode seeking generative adversarial networks for diverse image synthesis," in Proceedings of the IEEE Conference on Computer Vision and Pattern Recognition, pp. 1429-1437 (2019).
Z. Lin et al., "Pacgan: The power of two samples in generative adversarial networks," IEEE J. Sel. Areas Inf. Theory 1(1), 324-335, IEEE (2020).
S.-W. Park, J.-H. Huh, and J.-C. Kim, "BEGAN v3: Avoiding Mode Collapse in GANs Using Variational Inference," Electronics 9(4), 688, Multidisciplinary Digital Publishing Institute (2020).
B. Adlam et al., "Learning gans and ensembles using discrepancy," in Advances in Neural Information Processing Systems, pp. 5796-5807 (2019).
P. Zhong et al., "Rethinking generative mode coverage: A pointwise guaranteed approach," in Advances in Neural Information Processing Systems, pp. 2088-2099 (2019).
A. Ghosh et al., "Multi-agent diverse generative adversarial networks," in Proceedings of the IEEE conference on computer vision and pattern recognition, pp. 8513-8521 (2018).
T.-H. Yu, O. Woodford, and R. Cipolla, "A Performance Evaluation of Volumetric 3D Interest Point Detectors," Int. J. Comput. Vis. 102, 180-197, Springer (2013) [doi:10.1007/s11263-012-0563-2].
I. Melekhov, J. Kannala, and E. Rahtu, "Siamese network features for image matching," in 2016 23rd International Conference on Pattern Recognition (ICPR), pp. 378-383 (2016).
C. Baur, S. Albarqouni, and N. Navab, "MelanoGANs: high resolution skin lesion synthesis with GANs," arXiv Prepr. arXiv1804.04338 (2018).
E. Dikici et al., "Automated Brain Metastases Detection Framework for T1-Weighted Contrast-Enhanced 3D MRI," arXiv preprint arXiv:1908.04701 (submitted Aug. 13, 2019).
E. Dikici et al., "Augmented Networks for Faster Brain Metastases Detection in T1-Weighted Contrast-Enhanced 3D MRI," arXiv preprint arXiv:2105.13406 (submitted May 27, 2021).
Non-Final Office Action in connection to U.S. Appl. No. 17/401,543, dated Dec. 23, 2023.
Interview Summary in connection to U.S. Appl. No. 17/401,543, dated Mar. 6, 2024.
1 Office Action for U.S. Appl. No. 17/401,543 dated Apr. 29, 2024, 15 pages.

\* cited by examiner

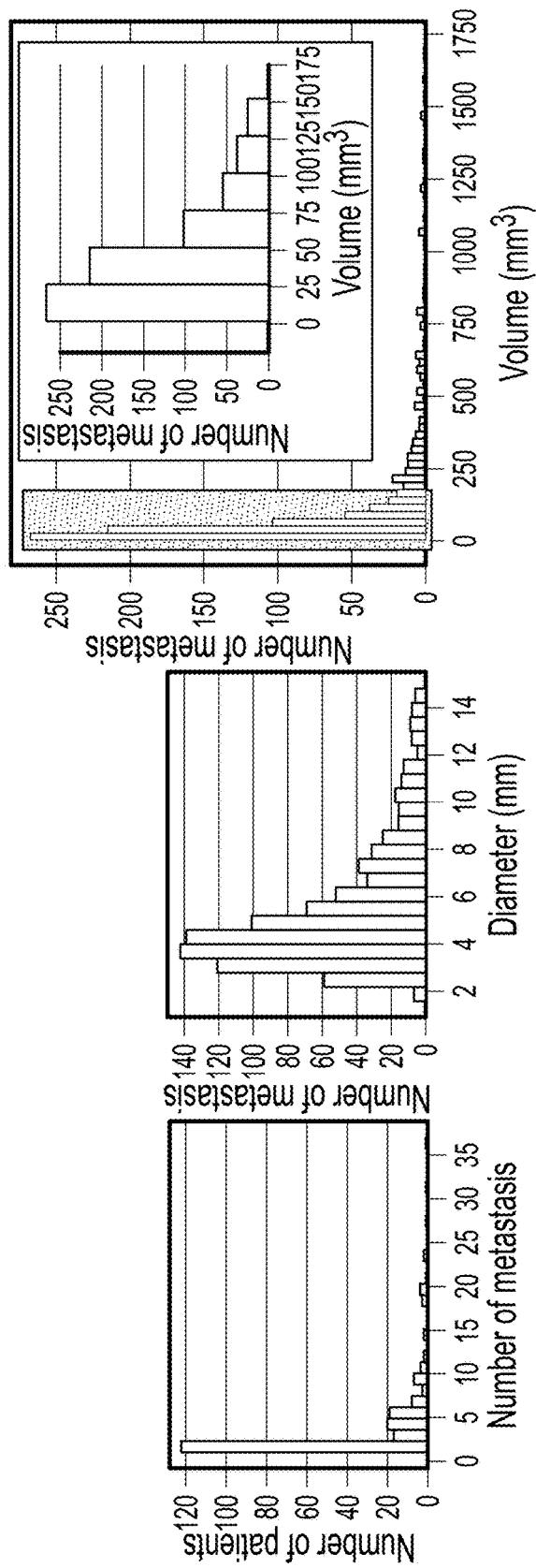
FIG. 6A  FIG. 6B  FIG. 6C
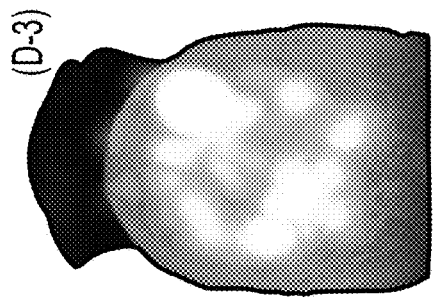
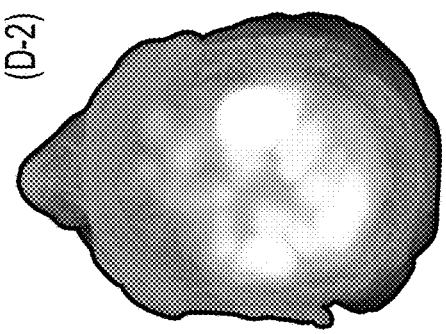
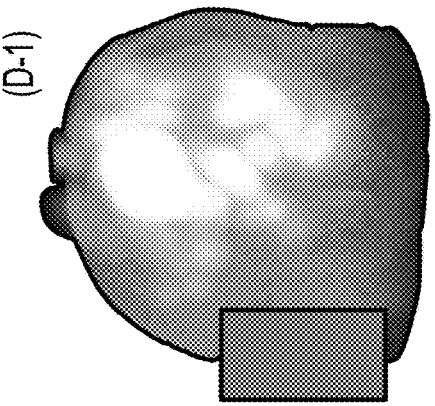
FIG. 6D

| Scanner | MF[a] (T) | TR[b] range (ms) | TE[c] range (ms) | Slice thickness range (mm) | Pixel size[d] range (mm) | Imaging frequency range (MHz) | Flip angle range (degrees) | Exam # |
|---|---|---|---|---|---|---|---|---|
| Siemens Aera[e] | 1.5 | [9.3, 9.7] | [4.4, 4.7] | 1.0 | [0.78, 0.97] | 63.6 | 20 | 54 |
| Siemens Avanto[e] | 1.5 | [9.7, 10] | [4.2, 4.8] | [0.9, 1.0] | [0.43, 0.86] | 63.6 | [15, 20] | 17 |
| Siemens Espree[e] | 1.5 | 10 | [4.5, 4.7] | 1.0 | [0.78, 1.0] | 63.6 | 20 | 26 |
| Siemens Skyra[e] | 3.0 | [6.2, 6.5] | 2.46 | [0.8, 0.9] | [0.65, 0.78] | 123.2 | [10.5, 12] | 34 |
| Siemens TrioTrim[e] | 3.0 | 6.5 | 2.45 | [0.8, 0.9] | [0.65, 0.73] | 123.2 | 10.5 | 4 |
| Siemens Verio[e] | 3.0 | [6.5, 9.0] | [2.4, 4.9] | [0.8, 0.9] | [0.65, 0.78] | 123.2 | 10.5 | 28 |
| GE Optima MR450w[f] | 1.5 | 10.3 | 4.2 | 1.0 | 0.49 | 63.9 | 20 | 26 |
| GE Signa HDxt[f] | 1.5 | [9.2, 10.3] | 4.2 | 1.0 | [0.49, 0.98] | 63.9 | 20 | 28 |

[a] Magnetic field strength, [b] repetition time, [c] echo time, [d] pixel size is same in x and y directions.
[e] Siemens Healthcare, Erlangen, Germany.
[f] GE Healthcare, Milwaukee, Wisconsin, USA.

*FIG. 11*

| CV fold | Min stdev (mm) | Max stdev (mm) | SSM (%)[a] | Radius Range (mm)[b] |
|---|---|---|---|---|
| 1 | 1 | 4 | 1.0 | [2,7] |
| 2 | 1 | 4 | 0.5 | [2,7] |
| 3 | 1 | 5 | 1.0 | [2,9] |
| 4 | 1 | 4 | 1.0 | [2,7] |
| 5 | 1 | 5 | 1.5 | [2,9] |

[a] SSM is described as the percentage of maximum image intensity.
[b] Gaussian kernel's radius range is derived from the minimal and maximal standard deviations.

FIG. 12

| Sensitivity % | nED-nG | nG | nED | Org |
|---|---|---|---|---|
| 80 | 10.56 | 7.05 | 3.81 | 2.96 |
| 82 | 14.33 | 7.52 | 4.71 | 3.82 |
| 85 | - | 13.2 | 7.29 | 5.85 |
| 90 | - | - | 12.33 | 9.12 |

Average number of false positives at specific sensitivity percentages are reported for the proposed solution with all augmentation stages (Org), and nED-nG, nG and nED configurations.

FIG. 13

| Study | Patient # | Acquisition | BM diameter (mm) | BM volume (mm) | DNN Type | Validation Type | Sensitivity (%) | AFP |
|---|---|---|---|---|---|---|---|---|
| Losch et al. [13] | 490 | T1c MRI | NA | NA | Multi-scale ConvNet | Fixed train/test [e] | 82.8 | 7.7 |
| Liu et al. [16] | 490 | Multi seq.[a] | NA | Mean: 672 | En-DeepMedic | 5-fold CV | NA | NA |
| Charron et al. [14] | 182 | Multi seq.[b] | Mean: 8.1 Median: 7 | Mean: 2400 Median: 500 | DeepMedic | Fixed train/test [f] | 93 | 7.8 |
| Grøvik et al. [18] | 156 | Multi seq.[c] | NA | NA | GoogLeNet [d] | Fixed train/test [g] | 83 | 8.3 |
| This study | 158 [h] | T1c MRI | Mean: 5.4 Median: 4.6 | Mean: 159.6 Median: 50.4 | *CropNet* | 5-fold CV | 90 | 9.12 |

[a] 235 T1c MRI datasets, and 265 datasets from BRATS DB; including both T1c and T2-weighted Fluid-Attenuated Inversion Recovery (FLAIR) sequences.
[b] T1-weighted 3D MRI with Gd injection, T2-weighted 2D fluid attenuated inversion recovery MRI and T1-weighted 2D MRI sequences.
[c] Pre- and post-gadolinium T1-weighted 3D fast spin echo (CUBE), post-gadolinium T1-weighted 3D axial IR-prepped FSPGR (BRAVO), and 3D CUBE fluid attenuated inversion recovery (FLAIR) sequences.
[d] 2.5 dimensional fully connected convolutional net based on GoogLeNet.
[e] 440 training and 50 test cases.
[f] 164 training and 18 test cases.
[g] 100 training, 5 development and 51 test cases.
[h] 217 datasets are collected from 158 patients, CV folds are created patient-wise to ensure a patient can only exist either in training or testing group.

FIG. 14

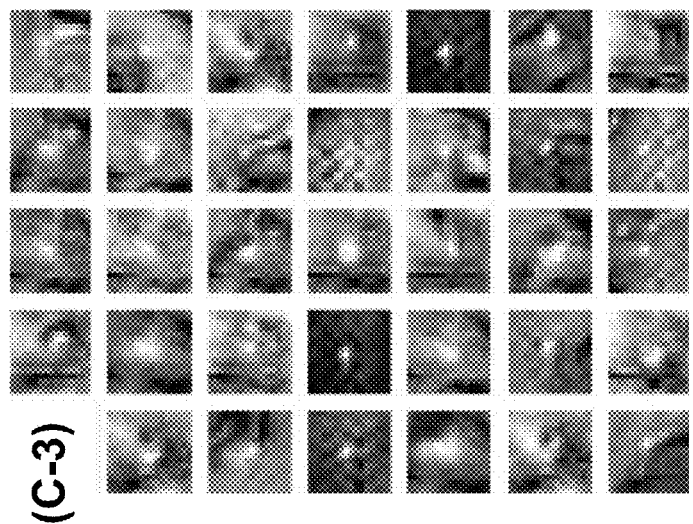
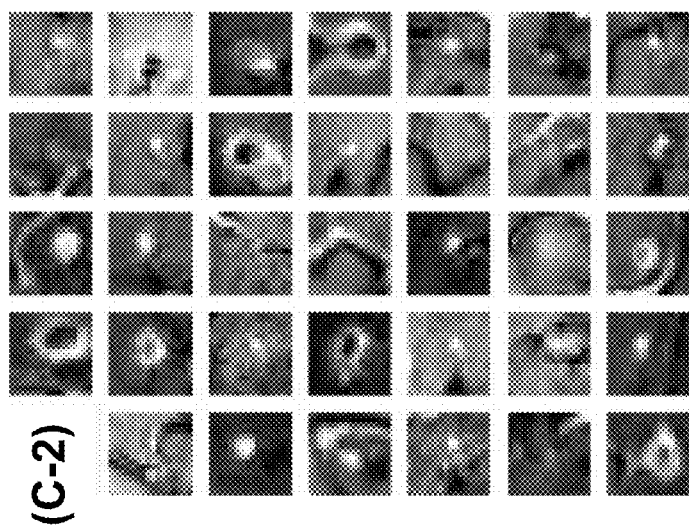
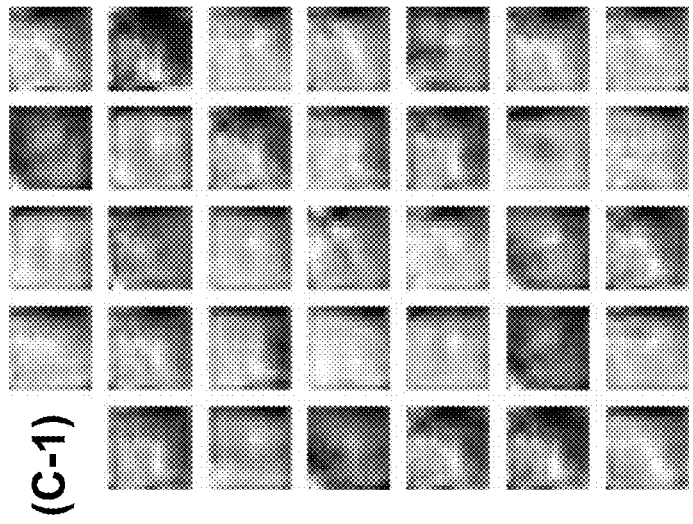
FIG. 17C

| Sensitivity % | Baseline | cGANe1 | cGANe5 | cGANe10 | cGANe20 | cGANe30 | cGANe40 |
|---|---|---|---|---|---|---|---|
| 75 | 1.90 | --- | 16.02 | 10.60 | 6.62 | 4.26 | 3.19 |
| 80 | 2.96 | --- | --- | 12.82 | 9.56 | 6.24 | 4.32 |
| 85 | 5.85 | --- | --- | --- | 13.42 | 8.26 | 6.22 |
| 90 | 9.12 | --- | --- | --- | --- | 12.47 | 9.53 |

*FIG. 21*

| Sensitivity % | Baseline | GANe1 | GANe5 | GANe10 | GANe20 | GANe30 | GANe40 |
|---|---|---|---|---|---|---|---|
| 75 | 1.90 | --- | --- | --- | 14.16 | 8.97 | 8.04 |
| 80 | 2.96 | --- | --- | --- | --- | 10.22 | 9.45 |
| 85 | 5.85 | --- | --- | --- | --- | 13.81 | 11.66 |
| 90 | 9.12 | --- | --- | --- | --- | --- | 16.03 |

*FIG. 22*

SYSTEMS FOR AUTOMATED LESION DETECTION AND RELATED METHODS

CROSS-REFERENCE TO RELATED APPLICATIONS

This application claims the benefit of U.S. provisional patent application No. 63/065,015, filed on Aug. 13, 2020, and titled "SYSTEMS FOR AUTOMATED LESION DETECTION AND RELATED METHODS," the disclosure of which is expressly incorporated herein by reference in its entirety.

BACKGROUND

Brain metastases (BM) are disseminated cancer formations commonly originating from breast cancer, lung cancer, or malignant melanoma [1]. Detection of BM is a tedious and time-consuming manual process for radiologists, with no allowance for reduced accuracy; missed detections potentially compromise the success of treatment planning for the patient. Accordingly, computer-aided detection approaches are desirable to assist radiologists by automatically segmenting and/or detecting BM in medical imaging modalities such as Magnetic Resonance Imaging (MRI) sequences or computed tomography (CT) imaging.

SUMMARY

Example systems and methods for lesion detection are described herein. In one aspect, an example system for lesion detection is described. The system includes at least one processor and a memory operably coupled to the at least one processor. The system also includes a candidate selection module stored in the memory that, when executed by the at least one processor, is configured to receive an image, determine a plurality of candidate points in the image, and select a respective volumetric region centered by each of the candidate points. A portion of a lesion has a high probability of being determined as a candidate point. The system further includes a deep learning network configured to receive the respective volumetric regions selected by the candidate selection module, and determine a respective probability of each respective volumetric region to contain the lesion.

In some implementations, the candidate selection module is configured to determine the candidate points in the image using a Laplacian of Gaussian (LoG) approach. Optionally, the candidate selection module is configured to determine the candidate points in the image using the LoG approach with sensitivity constraint. In other implementations, the candidate selection module is configured to determine the candidate points in the image using a convolutional neural network (CNN).

Alternatively or additionally, the deep learning network is optionally further configured to classify each respective volumetric region as a positive or negative lesion candidate based on its respective probability to contain the lesion.

In some implementations, the system optionally includes an image annotation module stored in the memory that, when executed by the at least one processor, is configured to provide an annotation to highlight within the image a volumetric region classified as the positive lesion candidate. Optionally, the system further includes a display device, where the display device is configured to display the image and the annotation.

Alternatively or additionally, the deep learning network is a convolutional neural network (CNN).

Alternatively or additionally, the volumetric region is a 16 millimeter (mm)×16 mm×16 mm region, a 32 mm×32 mm×32 mm region, or a 64 mm×64 mm×64 mm region.

In some implementations, the lesion has a volume less than about 500 mm$^3$. Alternatively or additionally, in some implementations, the lesion has a size less than about 15 mm.

Alternatively or additionally, the image is a magnetic resonance imaging (MRI) image, a computed tomography (CT) image, a positron emission tomography (PET)-CT image, a three-dimensional (3D) mammography image, or a 3D ultrasound image.

Optionally, in some implementations, the lesion is a brain metastatic (BM) lesion. Alternatively, in other implementations, the lesion is a lung or liver metastatic lesion.

In one aspect, an example computer-implemented method for lesion detection is described. The method includes receiving an image, and determining a plurality of candidate points in the image. A portion of a lesion has a high probability of being determined as a candidate point. The method also includes selecting a respective volumetric region centered by each of the candidate points, and inputting each respective volumetric region into a deep learning network. The method further includes determining, using the deep learning network, a respective probability of each respective volumetric region to contain the lesion.

In some implementations, the plurality of candidate points in the image are determined using a Laplacian of Gaussian (LoG) approach. In other implementations, the plurality of candidate points in the image are determined using a convolutional neural network (CNN).

Alternatively or additionally, the deep learning network is a convolutional neural network (CNN).

Alternatively or additionally, the method further includes classifying each respective volumetric region as a positive or negative lesion candidate based on its respective probability to contain the lesion, displaying the image, and providing an annotation within the image to highlight a volumetric region classified as the positive lesion candidate.

Alternatively or additionally, the image is a magnetic resonance imaging (MRI) image, a computed tomography (CT) image, positron emission tomography (PET)-CT image, three-dimensional (3D) mammography image, or 3D ultrasound image.

In some implementations, the lesion has a volume less than about 500 mm$^3$. Alternatively or additionally, in some implementations, the lesion has a diameter less than about 15 mm.

In one aspect, another example system for lesion detection is described. The system includes a candidate selection convolutional neural network (CNN) configured to: receive an image, and determine a plurality of candidate regions in the image, where a portion of a lesion has a high probability of being determined as a candidate region. The system also includes a deep learning network configured to: receive the candidate regions determined by the candidate selection CNN, and determine a respective probability of each candidate region to contain the lesion.

In one aspect, an example method for training a deep learning network to detect lesions is described herein. The method includes providing a deep learning network, randomly selecting pairs of positive and negative lesion samples from an image dataset to create a training batch, and augmenting the training batch on the fly; and training the deep learning network to detect a lesion using the augmented training batch. The deep learning network processes a pair of augmented positive and negative lesion samples at each iteration.

In some implementations, the step of augmenting the training batch on the fly includes applying a random rigid transformation to each of the pair of positive and negative lesion samples.

In some implementations, the step of augmenting the training batch on the fly includes applying a random non-rigid transformation to each of the pair of positive and negative lesion samples.

In some implementations, the step of augmenting the training batch on the fly includes applying a random gamma correction to each of the pair of positive and negative lesion samples.

In some implementations, the step of augmenting the training batch on the fly includes applying an elastic deformation, a gamma correction, an image flipping, and an image rotation to each of the pair of positive and negative lesion samples.

In some implementations, the step of augmenting the training batch on the fly includes generating synthetic positive and negative lesion samples using a generative model trained using the training batch.

Alternatively or additionally, each of the pair of positive and negative lesion samples from the image dataset is volumetric region of an image. Optionally, the volumetric region of the image is a 16 millimeter (mm)×16 mm×16 mm region, a 32 mm×32 mm×32 mm region, or a 64 mm×64 mm×64 mm region.

Alternatively or additionally, the image dataset includes magnetic resonance imaging (MRI) images, computed tomography (CT) images, positron emission tomography (PET)-CT images, three-dimensional (3D) mammography images, or 3D ultrasound images.

Alternatively or additionally, the lesion is a brain, lung, or liver metastatic lesion.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIGS. 6A-6D illustrates the histograms for (FIG. 6A) number of BM per patient, (FIG. 6B) diameters of BM, and (FIG. 6C) volumes of lesions in BM database are shown. Below, in FIG. 6D, the BM probability density function's projections on left sagittal (D-1), axial (D-2), and coronal (D-3) planes are provided. Face region is covered to protect patient privacy.

FIG. 11 is Table 1, which shows MRI scanner parameters.

FIG. 12 is Table 2, which shows optimal LoG parameters and kernel radius range.

FIG. 13 is Table 3, which shows the average number of false positives (AFP) versus sensitivity.

FIG. 14 is Table 4, which shows an overview of BM detection/segmentation studies that use convolutional neural networks.

FIGS. 17A-17C illustrates sampled Fréchet Distance (SFD) for the DCGAN validation: (FIG. 17A) SFD between the original and sample set of generated data were computed periodically, in every 50 epochs; the minimal distance was reported at the measurement point C-2. (FIG. 17B) Binary cross-entropy loss for the generator and discriminator networks are plotted. (FIG. 17C) For three reference points (i.e., C-1, C-2, and C-3), mid-axial slices of randomly generated BM region volumes are shown: In C-1 and C-3, the samples do not resemble real BM appearance; C-1 presents limited variability, and C-3 has multiple samples with checkerboard-like artifacts. In C-2, the samples resemble the actual BM appearances; they are in various dimensions/contrasts, some even have cystic formations.

FIG. 18A is a graph of AFP in relation to the detection sensitivity for cGANe1. FIG. 18B is a graph of AFP in relation to the detection sensitivity for cGANe5. FIG. 18C is a graph of AFP in relation to the detection sensitivity for cGANe10. FIG. 18D is is a graph of AFP in relation to the detection sensitivity for cGANe20. FIG. 18E is a graph of AFP in relation to the detection sensitivity for cGANe30. FIG. 18F is a graph of AFP in relation to the detection sensitivity for cGANe40. FIG. 18G is is a graph of AFP in relation to the detection sensitivity for baseline. FIG. 18H is the average curves for the baseline and cGANe setups.

FIG. 21 is Table 5, which shows average number of false positives at specific sensitivity percentages are reported for the baseline, cGANe1, cGANe5, cGANe10, cGANe20, cGANe30, and cGANe40 setups. Please note that cGANe1, cGANe5, cGANe10 and cGANe20 did not achieve 75%, 80%, 85% and 90% detection sensitivities respectively; therefore, these fields are empty.

FIG. 22 is Table 6, which shows average number of false positives at specific sensitivity percentages are reported for the baseline, GANe1, GANe5, GANe10, GANe20, GANe30, and GANe40 setups.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. As used herein, the terms "about" or "approximately", when used in reference to a linear dimension or volume, mean within plus or minus 10 percentage of the referenced linear dimension or volume.

Figure 23:
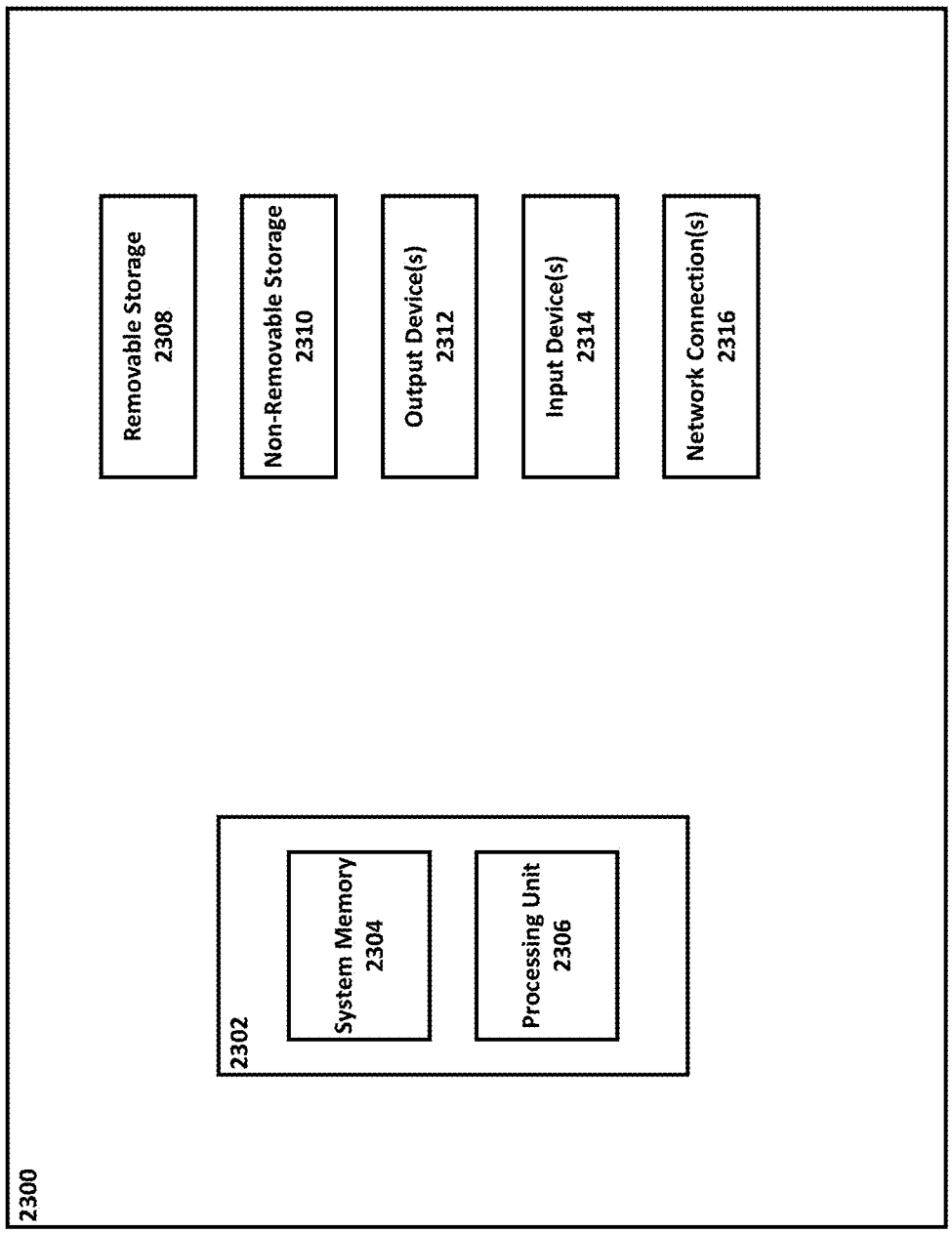
FIG. 23 is an example computing device.
Figure 24:
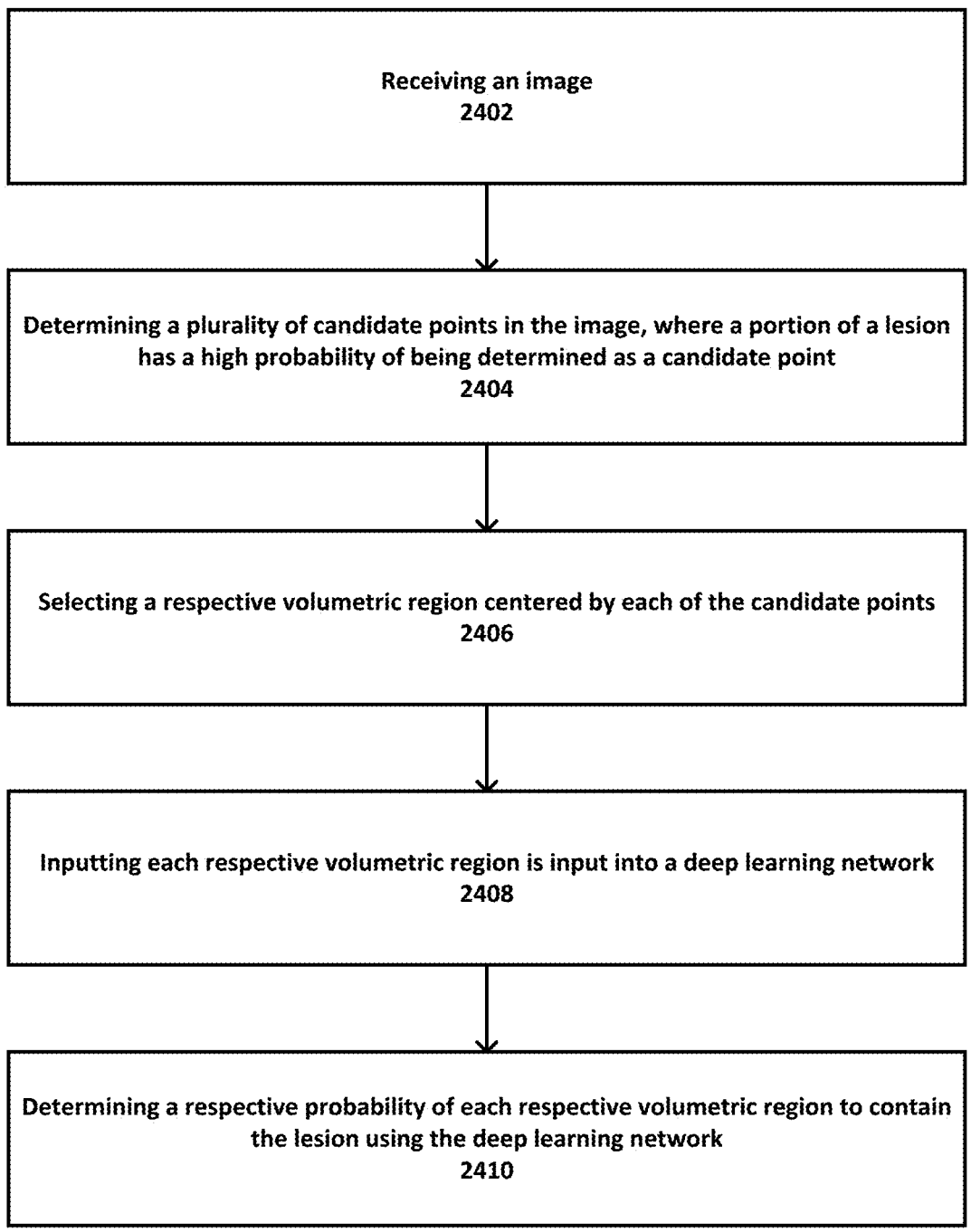
FIG. 24 is a flowchart illustrating example operations for lesion detection according to implementations described herein.

Referring now to FIG. 24, an example method for lesion detection is described. In the examples described herein, the lesion is a brain metastatic (BM) lesion. It should be understood that method of FIG. 24 can also be used to detect metastatic lesions in other organs such as the lung or liver and/or to detect other types of lesions (e.g., multiple sclerosis). This disclosure contemplates that the method can be implemented using a computing device (e.g., at least one processor and memory) such as a computing device described with regard to FIG. 23, for example. At step 2402, an image is received. This disclosure contemplates that step 2402 can optionally be performed by a candidate selection module (e.g., software) stored in memory of a computing device. As described herein, the image is a medical image such as a magnetic resonance imaging (MRI) image, a computed tomography (CT) image, positron emission tomography (PET)-CT image, three-dimensional (3D) mammography (or tomosynthesis) image, or 3D ultrasound image. Optionally, in some implementations, the image is a contrast-enhanced T1-weighted MRI image, for example as described in Examples 1 and 2 below. It should be understood that MRI, CT, PET-CT, 3D mammography, and 3D ultrasound images are provided only as examples. This disclosure contemplates that the techniques described herein may be applied to other volumetric imaging modalities.

Additionally, the image captures a portion of a patient's anatomy (e.g., brain, lung, liver, etc.). The image may include one or more lesions. As described herein, in some implementations, the lesions are metastases, which are malignant growths distant from the primary site of cancer. It should be understood that the image may include metastases located in other organs such as the lung or liver and/or may include other types of lesions (e.g., multiple sclerosis). Optionally, in some implementations, the lesions are brain metastatic (BM) lesions (see Examples 1 and 2). It should be understood that BM lesions are provided only as examples. This disclosure contemplates that the lesions may be located in other parts of the body including, but not limited to, a patient's lung or liver. Alternatively, this disclosure contemplates that the lesions may be benign lesion, premalignant lesions, or another non-cancerous lesion (e.g., lesion in the central nervous system caused by MS). The disclosed systems and methods can detect lesions in parts of a patient's body where lesions are otherwise difficult to detect using conventional means, for example, due to the vascular structure of the organ (e.g., brain, lung, liver) in which lesions develop.

At step 2404, a plurality of candidate points in the image are determined. This disclosure contemplates that step 2404 can optionally be performed by a candidate selection module (e.g., software) stored in memory of a computing device. The plurality of candidate points in the image can optionally be determined using a Laplacian of Gaussian (LoG) approach (see Example 1). Optionally, the plurality of candidate points in the image can be determined using the LoG approach with sensitivity constraint (see Example 1). The LoG approach is capable of detecting blob-shaped objects in the image. Such blob-shaped objects may or may not be actual lesions (e.g., metastatic lesions such as BM lesions). Differentiating between lesions, particularly tiny lesions, and vascular structure can be difficult. In general, lesions are nodular, whereas vessels are tubular. The LoG approach assists in making this differentiation. As described herein, the sensitivity of the LoG approach is selected such that a portion of a lesion has a high probability of being determined as a candidate point. For example, the sensitivity of the LoG approach can be selected such that about 96% of the actual lesions (e.g., metastatic lesions such as BM lesions) in an image are determined as candidate points at step 2404 (see Example 1). In other words, actual lesions have a high probability of being determined as candidate points. It should be understood that 96% is provided only as an example of high probability. This disclosure contemplates that the sensitivity of the LoG approach can be selected to determine any desired percentage of lesions as candidate points. It should also be understood that the LoG approach is provided only as an example. This disclosure contemplates that candidate points can be determined using other techniques including, but not limited to, Difference of Gaussian (DoG) approach, Difference of Hessian (DoH) approach, or deep learning networks. For example, the plurality of candidate points in the image can optionally be determined using a convolutional neural network (CNN) (see Example 3).

At step 2406, a respective volumetric region centered by each of the candidate points is selected. This disclosure contemplates that step 2406 can optionally be performed by a candidate selection module (e.g., software) stored in memory of a computing device. The size of the volumetric region can be selected, for example, based on the size of lesions (e.g., metastatic lesions such as BM lesions) to be detected. For example, in some implementations, the volumetric region is optionally a 16 millimeter (mm)×16 mm×16 mm region (see Example 1). As described below (see Example 1), the systems and methods described herein are capable of detecting "smaller" lesions, e.g., average BM volume of 160 mm$^3$ and/or <15 mm diameter when using a 16 mm×16 mm×16 mm volumetric region. It should be understood that the 16 mm×16 mm×16 mm volumetric region size is provided only as an example. This disclosure contemplates using volumetric region sizes other than 16 mm×16 mm×16 mm including, but not limited to, a 32 mm×32 mm×32 mm region or a 64 mm×64 mm×64 mm region. For example, the volumetric region size can be selected depending on the size of the lesions of interest.

At step 2408, each respective volumetric region is input into a deep learning network. The deep learning network is trained to detect lesions (e.g., metastatic lesions such as BM lesions in Example 1) as described below. In other words, the respective volumetric regions of the image, which are detected and selected at steps 2404 and 2406, are input into the deep learning network. Such volumetric regions have been analyzed and previously determined to have a high probability of being a lesion candidate. The deep learning network therefore analyzes candidates (e.g., volumetric regions of images) and makes a determination (e.g., probability) as to whether such candidates contain a lesion. According to the techniques described herein, the deep learning network does not receive the entire image as an input and instead receives only volumetric regions detected and selected as described herein.

Figure 5:
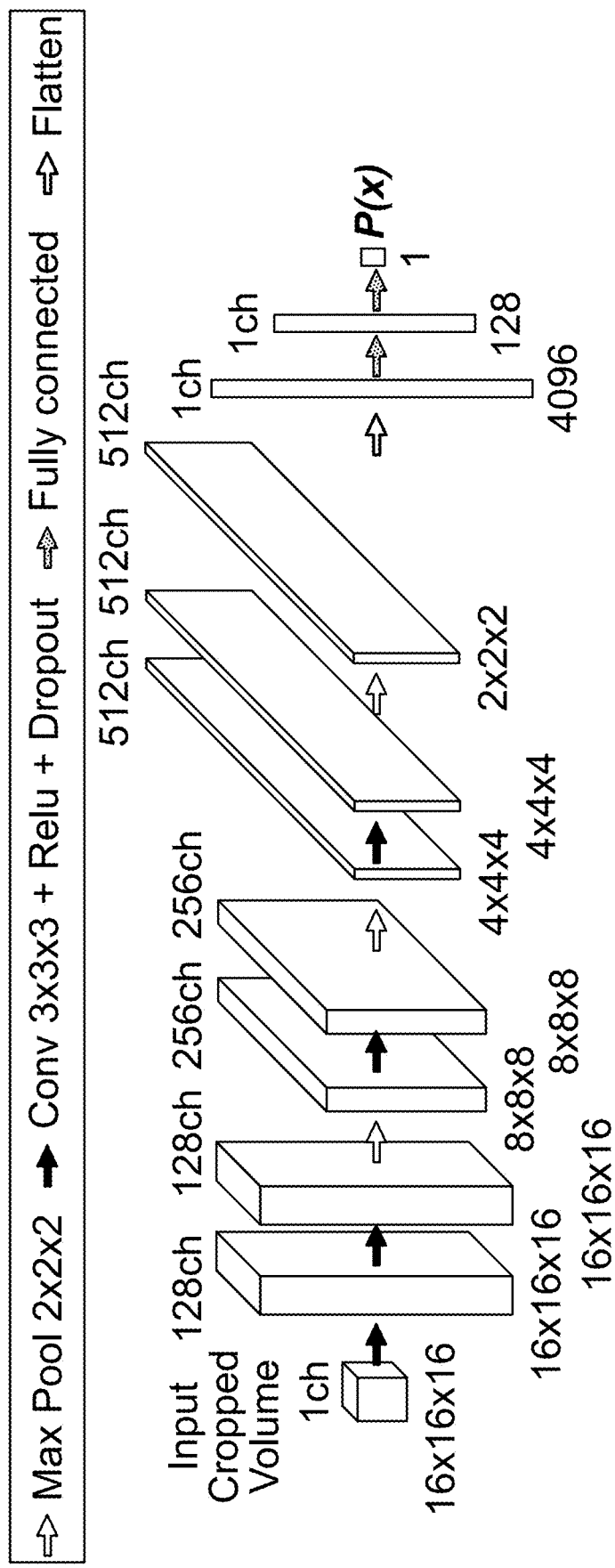
FIG. 5 is a diagram of an example deep neural network (CNN) according to an implementation described herein. CropNet-b2-16 mm: Input of this CNN is 16 mm×16 mm×16 mm isotropic region-of-interest, and each resolution level consists of two identical blocks, where the output is a scalar in range of [0, 1].

Optionally, the deep learning network is a convolutional neural network (CNN) (see Example 1, FIG. 5). It should be understood that a CNN is provided only as an example deep learning network. This disclosure contemplates using deep learning networks other than a CNN, for example, a recurrent neural network (RNN) where 2D neural networks applied in consecutive/recursive fashion and their consequential outputs are processed. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can optionally be arranged in a plurality of layers such as input layer, output layer, and one or more hidden layers. Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement a function (e.g., sigmoid function or rectified linear unit (ReLU) function), and provide an output in accordance with the function. Additionally, each node is associated with a respective weight. ANNs are trained with a data set (e.g., the image dataset including positive and negative lesion samples described herein) to minimize the cost function, which is a measure of the ANN's performance. Training algorithms include, but are not limited to, backpropagation. The training algorithm tunes the node weights and/or bias to minimize the cost function. It should be understood that any algorithm that finds the minimum of the cost function can be used to for training the ANN. A convolutional neural network (CNN) is a type of deep neural network that has been applied, for example, to image analysis applications. Unlike a traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks.

At step 2410, a respective probability of each respective volumetric region to contain the lesion (e.g. metastatic lesions such as BM lesions) is determined using the deep learning network. For example, the deep learning network can output a scalar in range [0, 1] (e.g., the deep learning network performs a regression). Optionally, each respective volumetric region can be classified as a positive or negative lesion candidate based on its respective probability to contain the lesion (e.g., the deep learning network performs a classification). If probability is greater than a threshold value, a volumetric region is classified as a positive lesion candidate. On the other hand, if probability is less than a threshold value, a volumetric region is classified as a negative lesion candidate. As described herein (see Example 1), the threshold value can be selected to achieve a desired detection sensitivity and/or corresponding false positives. For example, during validation in Example 1, the system's detection sensitivity and corresponding false positives were reported for a range of threshold values. Then, at deep learning network deployment, the threshold value (0.94) that led to 90% detection sensitivity was selected. It should be understood that the values for detection sensitivity, corresponding false positives, and/or threshold value described herein are provided only as examples and can have values other than those provided as examples.

Optionally, an annotation to highlight within the image a volumetric region classified as a positive lesion candidate can be provided. This disclosure contemplates that the annotation can optionally be performed by an image annotation module (e.g., software) stored in memory of a computing device. Additionally, the system can further include a display device, which is configured to display the image and the annotation. Example annotations are shown, for example, in FIG. 10.

The systems and methods described herein are capable of detecting "smaller" lesions. In some implementations, the lesion has a volume between about 100 mm$^3$ and about 1500 mm$^3$. In some implementations, the lesion has a volume less than about 500 mm$^3$. In some implementations, the lesion has a volume less than about 400 mm$^3$. In some implementations, the lesion has a volume less than about 300 mm$^3$. In some implementations, the lesion has a volume less than about 200 mm$^3$. Optionally, in some implementations, the lesions have an average volume of about 160 mm$^3$. For example, in Example 1, the average BM volume is 160 mm$^3$ (with BM volume of 275 mm$^3$ being within the standard deviation). Alternatively or additionally, a diameter of the lesion is between about 2 mm and 15 mm (e.g., 2.0 mm, 2.1 mm, 2.2 mm, . . . , 14.8 mm, 14.9 mm, 15.0 mm). For example, in Example 1, the BMs have diameters greater than 2 mm and less than 15 mm. It should be understood that the lesion volumes and/or sizes described herein are provided only as examples. The systems and methods of Example 1 were trained and tuned to detect BM lesions with diameters less than 15 mm. This disclosure contemplates that the lesion volumes and/or sizes can have values other than those described herein. The candidate selection module and/or deep learning network can be designed and tuned to detect lesions of different sizes. For example, the size of the volumetric region can be selected in dependence on the lesion size of interest and the deep learning network can be trained accordingly.

Candidate point selection (see e.g., FIG. 24, step 2404) using an LoG approach is a CPU-intensive technique. As an alternative, a CNN can be used to determine the plurality of candidate points in the image (see e.g., FIG. 24, step 2404). For example, a system for lesion detection can include a candidate selection CNN (e.g., cdCNN, Example 3) configured to: receive an image, and determine a plurality of candidate regions in the image, where a portion of a lesion has a high probability of being determined as a candidate region. The system can also include a deep learning network (see e.g., FIG. 5, CropNet-b2-16 mm, Example 1) configured to: receive the candidate regions determined by the candidate selection CNN, and determine a respective probability of each candidate region to contain the lesion.

An example method for training a deep learning network to detect lesions (e.g., metastatic lesions such as BM lesions) is also described herein. The example training method can be used to train the deep learning network that is used in steps 2408 and 2410 of FIG. 24. As described herein, the deep learning network is designed to classify candidates (e.g., the respective volumetric regions selected at step 2406 of FIG. 24) as positive (implies that the candidate point holds high probability for being a center of lesion mass) or negative. Medical images (e.g., MRIs, CTs, PET-CTs, 3D mammography, 3D ultrasound) contain a relatively small number actual lesions. In other words, there would be far fewer actual lesions (positives) than other objects (negatives) in an image dataset. The class representations (i.e., positives and negative candidates) would therefore be highly unbalanced. Additionally, the size of the image dataset may be too small for training purposes. The training method described herein addresses these problem using (1) random paired data selection strategy, and (2) on the fly data augmentation aiming to represent the covariance of lesion representations using a stochastic methodology.

Figure 2A:
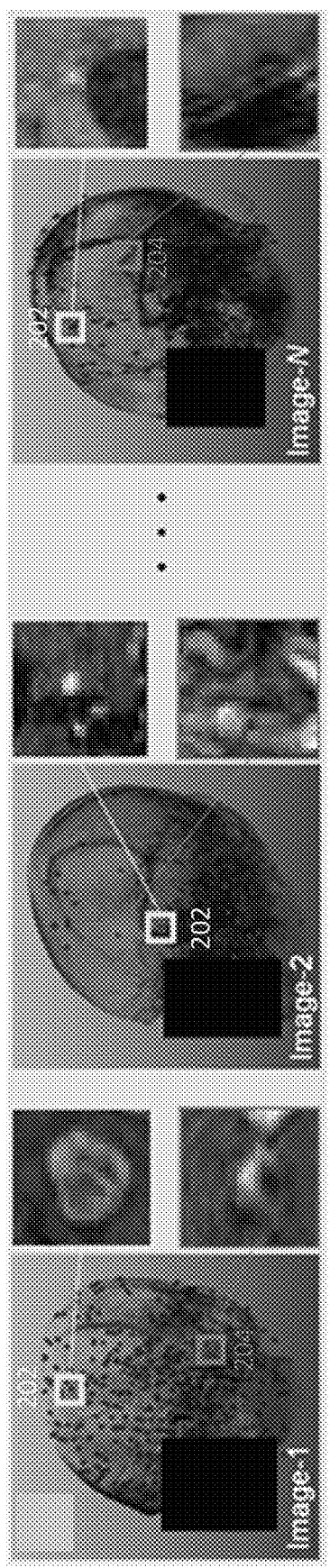
FIGS. 2A-2B illustrates positive and negative pair batch (FIG. 2A, Row A) and example image augmentation (FIG. 2B, Row B). Row A: Compilation of the positive & negative pair batch is represented. Positive and negative samples (shown with yellow rectangles 202 and green rectangles 204 respectively), are selected from BM candidates shown with red spheres in each dataset. Row B: Each positive sample goes through augmentation process: (B-1) mid-axial slice of an original cropped sample, (B-2) random elastic deformation is applied, (B-3) random gamma correction is applied, (B-4) sample volume is randomly flipped, and (B-5) sample volume is randomly rotated. The middle part of the randomly cropped volume, shown with a dashed red square in B-5, is used for the training. Face regions are covered to protect patient privacy.
Figure 2B:
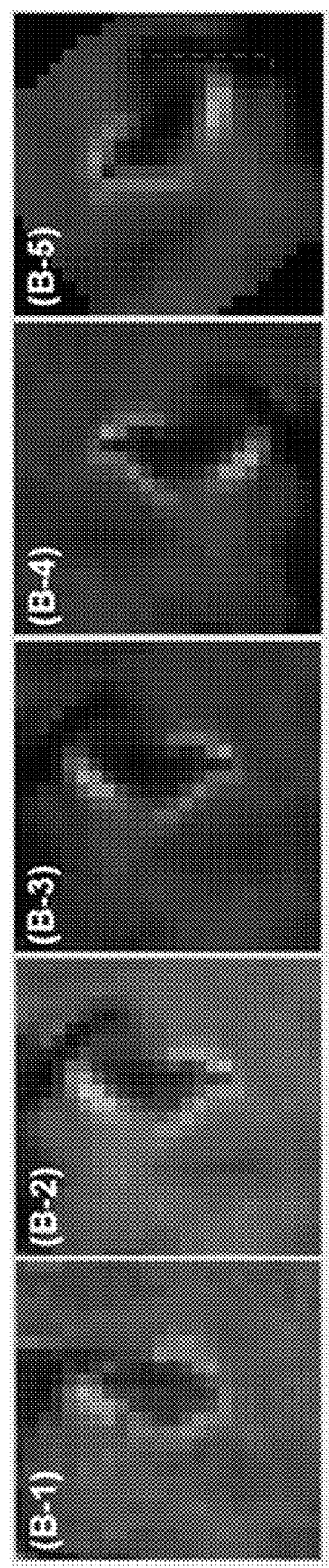

The method includes providing a deep learning network such as a CNN (see Example 1). The method also includes randomly selecting pairs of positive and negative lesion samples from an image dataset to create a training batch (see Example 1, FIG. 2, Row A). The method further includes augmenting the training batch on the fly (i.e., online data augmentation). In contrast to offline data augmentation, which increases the size of the training dataset by a factor equal to the number of transformations before training, augmentation on the fly involves performing transformations on a smaller batch (e.g., the pairs of positive and negative lesion samples) just prior to inputting the augmented pairs into the deep learning network. Thereafter, the method includes training the deep learning network to detect a lesion using the augmented training batch. As described herein (see Example 1), the deep learning network processes a pair of augmented positive and negative lesion samples at each iteration.

In some implementations, the step of augmenting the training batch on the fly includes applying a random rigid transformation to each of the pair of positive and negative lesion samples. Alternatively or additionally, the step of augmenting the training batch on the fly includes applying a random non-rigid transformation to each of the pair of positive and negative lesion samples. Alternatively or additionally, the step of augmenting the training batch on the fly includes applying a random gamma correction to each of the pair of positive and negative lesion samples.

In some implementations, the step of augmenting the training batch on the fly includes applying an elastic deformation, a gamma correction, an image flipping, and an image rotation to each of the pair of positive and negative lesion samples (see Example 1).

In some implementations, the step of augmenting the training batch on the fly includes generating synthetic positive and negative lesion samples using a generative model trained using the training batch. Optionally, the generative model includes a plurality of generative adversarial networks (GANs) (see Example 2).

An example computer-implemented method for generating synthetic image data is also described (see Example 2). The method includes maintaining an image dataset including a plurality of images, and generating a plurality of synthetic images using a generative model, wherein the generative model is trained using the image dataset. Optionally, the generative model includes a plurality of generative adversarial networks (GANs). Alternatively or additionally, the synthetic images are significantly different than the images in the image dataset. Alternatively or additionally, the image dataset includes magnetic resonance imaging (MRI) images, a computed tomography (CT) images, ultrasound images, x-ray images, or other imaging modality. Alternatively or additionally, the method optionally further includes training a machine learning algorithm using the synthetic images.

It should be appreciated that the logical operations described herein with respect to the various figures may be implemented (1) as a sequence of computer implemented acts or program modules (i.e., software) running on a computing device (e.g., the computing device described in FIG. 23), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 23, an example computing device 2300 upon which the methods described herein may be implemented is illustrated. It should be understood that the example computing device 2300 is only one example of a suitable computing environment upon which the methods described herein may be implemented. Optionally, the computing device 2300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 2300 typically includes at least one processing unit 2306 and system memory 2304. Depending on the exact configuration and type of computing device, system memory 2304 may be volatile (such as random access memory (RAM)), non-volatile (such as read-only memory (ROM), flash memory, etc.), or some combination of the two. This most basic configuration is illustrated in FIG. 23 by dashed line 2302. The processing unit 2306 may be a standard programmable processor that performs arithmetic and logic operations necessary for operation of the computing device 2300. The computing device 2300 may also include a bus or other communication mechanism for communicating information among various components of the computing device 2300.

Computing device 2300 may have additional features/functionality. For example, computing device 2300 may include additional storage such as removable storage 2308 and non-removable storage 2310 including, but not limited to, magnetic or optical disks or tapes. Computing device 2300 may also contain network connection(s) 2316 that allow the device to communicate with other devices. Computing device 2300 may also have input device(s) 2314 such as a keyboard, mouse, touch screen, etc. Output device(s) 2312 such as a display, speakers, printer, etc. may also be included. The additional devices may be connected to the bus in order to facilitate communication of data among the components of the computing device 2300. All these devices are well known in the art and need not be discussed at length here.

The processing unit 2306 may be configured to execute program code encoded in tangible, computer-readable media. Tangible, computer-readable media refers to any media that is capable of providing data that causes the computing device 2300 (i.e., a machine) to operate in a particular fashion. Various computer-readable media may be utilized to provide instructions to the processing unit 2306 for execution. Example tangible, computer-readable media may include, but is not limited to, volatile media, non-volatile media, removable media and non-removable media implemented in any method or technology for storage of information such as computer readable instructions, data structures, program modules or other data. System memory 2304, removable storage 2308, and non-removable storage 2310 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 2306 may execute program code stored in the system memory 2304. For example, the bus may carry data to the system memory 2304, from which the processing unit 2306 receives and executes instructions. The data received by the system memory 2304 may optionally be stored on the removable storage 2308 or the non-removable storage 2310 before or after execution by the processing unit 2306.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Brain Metastases (BM) complicate 20-40% of cancer cases. BM lesions can present as punctate (1 mm) foci, requiring high-precision Magnetic Resonance Imaging (MRI) in order to prevent inadequate or delayed BM treatment. However, BM lesion detection remains challenging partly due to their structural similarities to normal structures (e.g., vasculature). We propose a BM-detection framework using a single-sequence gadolinium-enhanced T1-weighted 3D MRI dataset. The framework focuses on the detection of smaller (<15 mm) BM lesions and consists of: (1) candidate-selection stage, using Laplacian of Gaussian approach for highlighting parts of an MRI volume holding higher BM occurrence probabilities, and (2) detection stage that iteratively processes cropped region-of-interest volumes centered by candidates using a custom-built 3D convolutional neural network ("CropNet"). Data is augmented extensively during training via a pipeline including random gamma correction and elastic deformation stages; the framework thereby maintains its invariance for a plausible range of BM shape and intensity representations. This approach is tested using five-fold cross-validation on 217 datasets from 158 patients, with training and testing groups randomized per patient to eliminate learning bias. The BM database included lesions with a mean diameter of ~5.4 mm and a mean volume of ~160 mm$^3$. For 90% BM-detection sensitivity, the framework produced on average 9.12 false-positive BM detections per patient (standard deviation of 3.49); for 85% sensitivity, the average number of false-positives declined to 5.85. Comparative analysis showed that the framework produces comparable BM-detection accuracy with the state-of-art approaches validated for significantly larger lesions.

Introduction

Brain metastases (BM) are disseminated cancer formations commonly originating from breast cancer, lung cancer, or malignant melanoma [1]. Detection of BM is a tedious and time-consuming manual process for radiologists, with no allowance for reduced accuracy; missed detections potentially compromise the success of treatment planning for the patient. Accordingly, computer-aided detection approaches have been proposed to assist radiologists by automatically segmenting and/or detecting BM in contrast-enhanced Magnetic Resonance Imaging (MRI) sequences, which is the key modality for the detection, characterization, and monitoring of BM. To this end, the most important imaging sequence is a T1-weighted image acquisition following intravenous administration of a gadolinium-based contrast agent. This sequence is particularly helpful for demonstrating vascularity within lesions as seen with BMs. Differentiating between tiny BM and vascular structure can be difficult, but in general, BMs are nodular, whereas vessels are tubular. Additional imaging, such as from T2-weighted or Fluid Attenuated Inversion Recovery (FLAIR) sequences, can be helpful to further characterize cysts and edema respectively. However, these features are more commonly seen with relatively larger lesions and contrast enhancement remains the optimal approach differentiating tiny BMs from benign lesions. This is especially true when 3D volumetric isotropic acquisitions are used (slices with thickness 1 mm), a key component in the detection of small brain lesions [2]. Different implementations of 3D T1-weighted images exist depending on the vendor; some examples include CUBE/BRAVO (from GE, SPACE/MPRAGE (from Siemens), and VISTA/3D TFE (from Philips).

Methods utilizing traditional image processing and machine learning techniques, such as template matching [3][4][5], 3D cross-correlation metrics [6], fuzzy logic [7], level sets [8], and selective enhancement filtering [9] are reported to produce promising results. In recent years, Convolutional Neural Network (CNN) [10] based approaches have started to be used extensively in a variety of medical imaging problems [11][12], and this holds great promise for BM evaluation.

To our knowledge, the application of a Deep Neural Network (DNN) for segmentation of BM in MRI datasets was first introduced by Losch et al. [13]. Besides analyzing the impact of different network structures on the segmentation accuracy, their study also showed that a DNN can produce comparable or even better results with respect to previously reported state-of-art approaches. However, a limitation of their approach was a significant reduction in accuracy for the segmentation of tumors with sizes below 40 mm$^3$.

Charron et al. [14] used DeepMedic neural network [15] for segmenting and detecting BM in multi-sequence MRI datasets as input, including post-contrast T1-weighted 3D, T2-weighted 2D fluid-attenuated inversion recovery, and T1-weighted 2D sequences. The study involved investigation of the impacts of epoch, segment, and/or batch sizes on overall accuracy, thus providing a well-documented hyper-parameter optimization process. The BM considered in their study had a mean volume of 2400 mm$^3$, and the system detected 93% of lesions whereas producing 7.8 average false-positive detections per patient.

Liu et al. proposed a modified DeepMedic structure, "En-DeepMedic" [16], with the expectation of improved BM segmentation accuracy and higher computational efficiency. The approach was validated with both the BRATS database [17] and their post-contrast T1-weighted MRI collection of brain metastases with a mean tumor volume of 672 mm$^3$. The system yielded an average Dice similarity coefficient of 0.67, where the detection false-positive rate in connection to the sensitivity percentage is not reported.

More recently, Grøvik et al. [18] demonstrated the usage of 2.5D fully CNN, based on GoogLeNet architecture [19], for detection and segmentation of BM. Their solution utilized multiple sequences of MRI for each patient: T1-weighted 3D fast spin-echo (CUBE), post-contrast T1-weighted 3D axial IR-prepped FSPGR, and 3D CUBE fluid-attenuated inversion recovery. Their database included 156 patients, with testing performed on 51 patients. For the detection of BM, at 83% sensitivity, average number of false-positives per patient is reported as 8.3.

Figure 1:
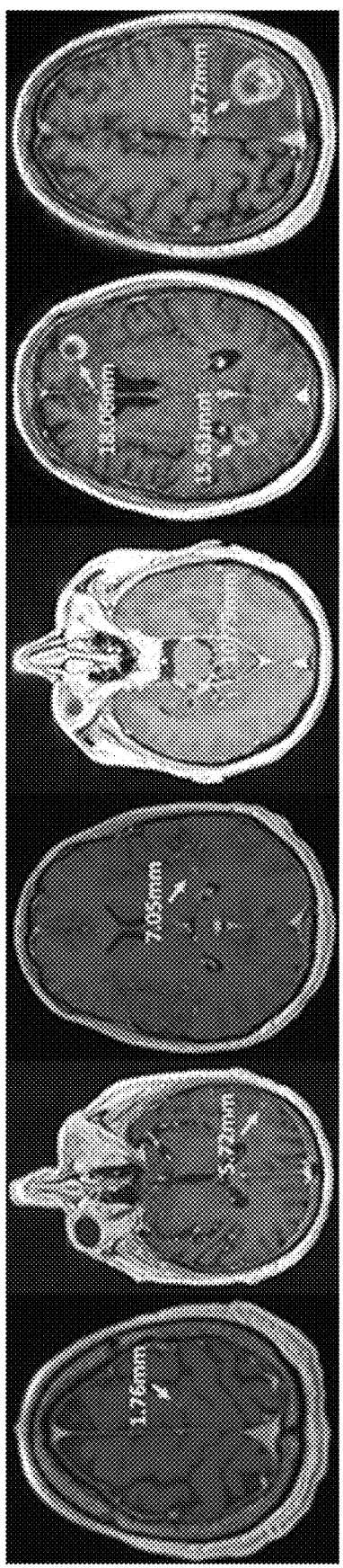
FIG. 1 illustrates examples of brain metastases with their corresponding diameters. The study proposes a framework for detection of BM with diameters of 3.5 mm. The 2D axial view images are each scaled independently.

The motivation for our study is to provide a BM-detection framework for 3D T1-weighted contrast-enhanced MRI datasets that focuses on small lesions (≤15 mm) with an average volume of only ~160 mm$^3$ (see FIG. 1). Such tiny lesions are difficult for even experienced neuroradiologists to detect, and missed lesions can lead to inadequate or delayed treatment. To our knowledge, no prior work focused on BM with volumes smaller than 500 mm$^3$. Detection of small lesions is particularly important given the clinical challenge they represent and due to recent paradigm shift in how these lesions are treated with radiation. In the past, patients with multiple intracranial metastases were treated with whole brain radiation, making detection of individual lesions not as crucial. However, due to long-term cognitive decline associated with whole brain radiation, recent radiation treatment regimens target individual lesions, consequently making detection of even a tiny lesion crucial for the appropriate treatment [20].

Methods and Materials

The BM-detection framework includes two main components: (1) Candidate-selection step, and (2) a classification stage. First, the input MRI volume is processed using an information-theory based approach for detection of image points with high probability of representing BM. Next, volumetric regions centered by these candidate locations are iteratively fed into a custom-built CNN, CropNet, with extensive data augmentation, including rigid and non-rigid geometric transformations and intensity-based transformations. CropNet is a classification network, trained and validated to determine the probability of a given volumetric image to contain a BM. Algorithmic details of these stages are further described in the following subsections.

Metastasis Candidate Selection

The visual appearance of metastatic masses can be generalized to blob-shaped formations either with relatively brighter or darker interiors (i.e., due to central necrosis). Blob-detection has been previously addressed using various generalized scale-space methods [21], including the Laplacian of Gaussian (LoG) approach [22]. In the proposed detection framework, LoG is utilized for detecting BM candidates for a given MRI volume as it: (1) Avoids image noise via its inherited Gaussian filtering properties, (2) holds few parameters to optimize, and (3) robustly detects BM candidates, with sensitivity reported in the Results section.

Yu et al. deployed LoG in the detection stage of their BM segmentation approach for MRI images [23], solidifying the applicability of LoG in the domain of our study. We further enhance the approach with sensitivity constraints and use it in candidate selection.

Given volumetric image data V, scale-space representation can be defined as, $$L(x,y,z;s)=G(s)*V, \quad (1)$$

where s is the scale, and L gives the scale-space representation at s. Accordingly, the scale-normalized Laplacian operator is:

$$\nabla_{norm}^2 L = s(L_{xx}+L_{yy}+L_{zz}). \quad (2)$$

Local optima of the above equation, which are maxima/minima of $\nabla_{norm}^2 L$ with respect to both space and scale, represents the blob center positions [22].

The BM candidate-selection process aims to determine a set of image points that are closely located to the metastatic mass centers. Keeping the candidate list as short as possible is one of the main objectives for the process. However, the sensitivity of the framework needs to be maintained, which implies a comprehensive list of candidates. As these objectives are working against each other, the optimization process can be described as a minimax problem:

$$\arg\max_p(Sv(\text{LoG}(p,V),M)), \quad (3)$$

$$\arg\min_p(|\text{LoG}(p,V)|), \quad (4)$$

where Sv defines the sensitivity of the system based on (1) M representing the list of actual BM centers, and (2) LoG (p,V) denoting candidate points selected for input volume V with LoG parameters of p. As the sensitivity of the system is the major criterion in this study, we propose a solution where the sensitivity portion of the equation is constrained as $$\arg\max_{p,Sv\geq\theta}(S(\text{LoG}(p,V),M)), \quad (5)$$

with θ giving the minimal allowed sensitivity (e.g., 95 percent), and p is found via grid-search [24] constrained with Equation-4.

Network Training

During the training of the DNN, at each batch iteration, a pair of positive and negative samples are selected from each dataset randomly, producing a batch of 2N samples where N is the number of training cases. Next, the given batch is augmented on the fly [25], and the DNN is trained with the augmented batch (see FIG. 2A, row A). The term "epoch" is not used in this definition; as in the proposed framework, the samples are processed in a random pair basis, whereas epoch commonly refers to complete pass through all training data.

The augmentation process is the key for the introduced detection framework's learning invariance. The BM sample count is a small fraction of the total amount of samples—the learning process heavily depends on properly generalizing intensity and shape variations of BM. The importance of data augmentation for general computer vision and similar medical imaging scenarios are further described in [26] and [27], respectively. The detection framework deploys an augmentation pipeline consisting of random (1) elastic deformation, (2) gamma correction, (3) image flipping, and (4) rotation stages (see FIG. 2B, row B). In the following subsections, technical details for random elastic deformation and random gamma correction augmentations are provided. Next, the CNN, which processes the augmented positive and negative sample volumes, is further described.

Random Elastic Deformations

The applicability of elastic deformations as a data augmentation step for detection of prostate cancer in multiparametric MRI was illustrated by Yang et al. [28]. In their study, to augment a given 2D-MRI image, a random group of control points and their corresponding random 2D relocation vectors were first determined. A thin-plate transformation [29] for the given control point and relocation vector pairs was then computed to generate a 2D elastic deformation field. For a similar medical application, Le et al. [30] showed the advantages of using both rigid and non-rigid (i.e., elastic) deformations during data augmentation.

Figure 3A:
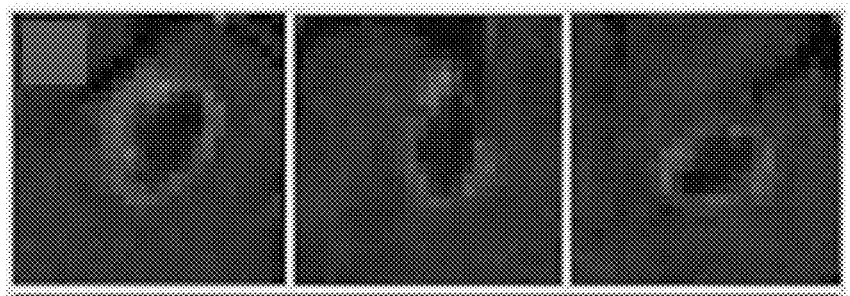
FIGS. 3A-3C illustrates the original cropped volume of a metastatic tumor mass (FIG. 3A), random displacement fields for x, y and z axes (FIG. 3B), and the corresponding deformed volume (FIG. 3C) are each shown from mid-axial, sagittal, and coronal views.
Figure 3B:
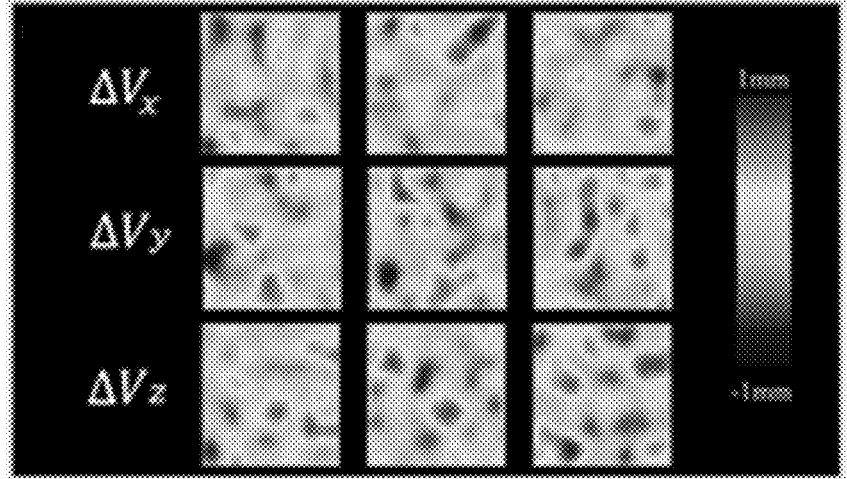
Figure 3C:
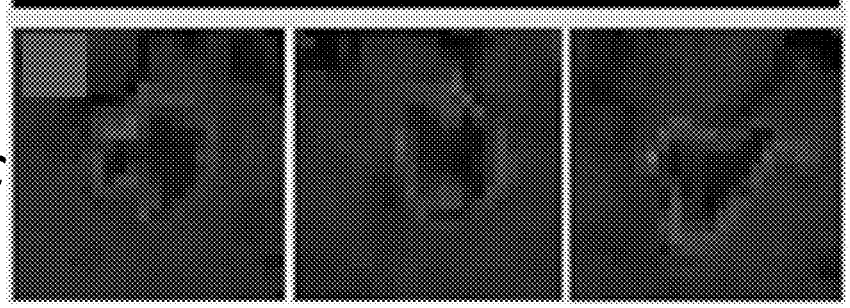

In our study, plausible non-rigid augmentations of the BM regions are produced by a fully 3D approach that does not require control points: the method generalizes the random elastic deformation field generation algorithm proposed by Simard et al. [31] to 3D. More explicitly, for a given volumetric image data V, random displacements fields $\Delta V_x$, $\Delta V_y$ and $\Delta V_z$ are defined, where each of these has similar dimensions as V, and their voxels hold random values picked from a uniform distribution defined in the range of [0, 1]. Next, these random fields are smoothed with a zero-centered Gaussian kernel with a standard deviation of σ (defined in mm). Finally, the deformation field is scaled with an elasticity coefficient α. Choice of σ causes elastic deformation to be (1) pure random with σ≤0.01, and (2) almost affine with σ≥5, whereas α determines the magnitude of the introduced local deformations (FIGS. 3A-3C).

The DNN described in the following subsection aims to classify each BM candidate as positive (implies that the candidate point holds high probability for being a center of metastatic mass) or negative. The proposed BM candidate selection method generates candidates in magnitudes of thousands (please refer to Results section for actual numbers), where only a few of these are true BMs. Thus, the network training should factor in highly unbalanced class representations. The proposed detection framework addresses this using (1) random paired data selection strategy, and (2) on the fly data augmentation stage aiming to represent the covariance of tumor representations using a stochastic methodology.

The usage of elastic deformations in the augmentation stage is crucial for the proposed framework, as it facilitates the generation of a conceivable BM shape domain. However, the algorithm needs to be used with well-tested parameters to ensure the viability of the augmented BM samples. In their paper, Simard et al. suggest the usage of $\sigma=4$ and $\alpha=34$, as it yielded the best results in their analyses. Our framework adopted those optimal parameters after visual inspections by a medical expert.

Random Gamma Corrections

In MRI, tissues do not have consistent intensity ranges, such as in computed tomography. Usage of bias field correction might improve the predictability of tissue intensities. However, its success is limited due to machine-dependent parameters [32]. Medical image processing algorithms, both information-theory and DNN based, benefit from understanding the probabilistic distributions of tissue intensity values. One way to achieve this goal is the normalization of image intensities in MRI to represent the target tissues with predefined intensity ranges [33]. Using even order derivatives of the histogram [34], Gaussian intensity normalization of selected tissues [35], and utilizing the median of intensity histogram [36] are some of the approaches introduced for that purpose. However, these methods are shown to be prone to errors as they aim to define approximations to non-linear intensity matching problems. The region-based approach [37], is shown to be effective, as it divides the spatial domain into smaller regions to address this limitation via piecewise linear approximations.

In the proposed framework, a form of the region-based strategy is introduced; random gamma corrections are applied to cropped volumetric regions during the augmentation stage [38]. Accordingly, the framework (1) does not make any assumptions about the histogram shape or intensity characteristics of given MRI datasets, and (2) avoids losing or corrupting potentially valuable intensity features, which is a common disadvantage of image intensity normalization-based methods.

Figure 4:
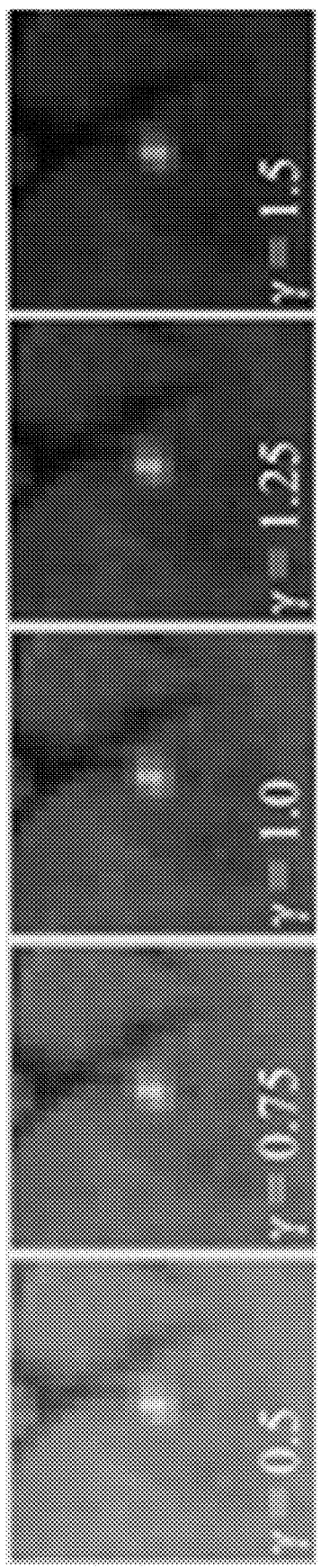
FIG. 4 illustrates the effects of gamma correction on region centering ~2.2 mm diameter metastasis (mid axial slice of a cropped 3D volume). Please note that $\gamma=1.0$ represents the original image.

Gamma correction of given volumetric data is given by, $$V_G = V_N^{(1/\gamma)}, \quad (6)$$

where $V_N$ is the intensity scaled volumetric image data in [0,1] range, $\gamma$ is the gamma value, and $V_G$ is the gamma-corrected volumetric image data, which is also intensity scaled (see FIG. 4).

In the detection framework, the gamma correction augmentations are utilized by randomly picking $\gamma$ values from a uniform distribution defined in [0.8, 1.2] range, determined empirically by investigating the visual appearance of gamma-corrected volumetric regions.

Network Architecture

The CNN introduced in this study (i.e., CropNet) has an input layer with an isotropic-sampled volumetric region of interest (ROI), where each voxel represents 1 mm³. Please note that the input volume's edge length is used in model naming, such as CropNet-[c]mm, where c is the volume's edge length in mm. Besides, the model follows a typical contracting path structure: Each resolution level is formed using stacked blocks each consisting of convolution, rectified linear activation unit (ReLU) and dropout layers. Block count per resolution level is another configurable parameter for the introduced network, hence, included in the naming convention as CropNet-b[B], where B denotes the number of blocks per level. The network's downsampling is performed via 2×2×2 max-pooling, followed with channel doubling. The output is a one-dimensional scalar produced via the sigmoid activation layer, which holds value in the range of [0, 1] representing the likelihood of a given ROI to contain a metastatic mass. The network's convolution layers are initialized using Glorot uniform initializer as described in [39].

In FIG. 5, the formation of network architecture is illustrated for two blocks and 16 mm edge length (CropNet-b2-16 mm), thus the reader can associate naming convention with the CNN. As described in the Results section, the study employs 16 mm version of CropNet, as (1) the target objects have diameters smaller than 15 mm, and (2) CropNet-b2-16 mm produced comparable performance and allowed faster training with respect to its higher edge length versions (i.e. 32 and 64 mm).

Data Preprocessing

During the data preprocessing stage, all datasets are resampled to have (1 mm×1 mm×1 mm) voxels, as CropNet requires isotropic sampled ROIs at its input layer. No further morphological, or intensity altering transformations are applied to the data during this stage.

Database

Data Collection

This retrospective study was conducted under Institutional Review Board approval with a waiver of informed consent (institutional IRB ID: 2016H0084). A total of 217 post-gadolinium T1-weighted 3D MRI exams were collected from 158 patients: 113 patients with a single dataset, 33 patients with 2 datasets (i.e. one follow-up examination), 10 patients with 3 datasets, and 2 patients with 4 datasets. The images were collected from 8 scanners, where the acquisition parameters for each are summarized in Table 1 (FIG. 11). Dotarem (gadoterate meglumine) was used as the contrast agent.

Two of the major study selection parameters were that (1) none of the datasets involved lesions with diameter of 15 mm or larger, and (2) motion degraded studies were included.

Ground-truth BM segmentation masks were prepared by a radiologist, using a custom-built tool for the project [40]. The tool was developed using MeVisLab 2.8 (medical image processing and visualization framework developed by MeVis Medical Solutions AG), and it allows users to load volumetric MRI datasets, manually delineate the borders of BM, and edit the existing segmentation masks if needed.

Brain Metastases

The database included 932 BMs where, (1) mean number of BMs per patient is 4.29 ($\sigma=5.52$), median number per patient is 2, (2) mean BM diameter is 5.45 mm ($\sigma=2.67$ mm), median BM diameter is 4.57 mm, and (3) mean BM volume is 159.58 mm³ ($\sigma=275.53$ mm³), median BM volume is 50.40 mm³. FIGS. 6A-6C, provides the histograms for each of these distributions.

For better understanding of the localization of BMs included in our database, all BMs are registered on a reference MRI image, and the probability density function is generated for multiple projections in FIG. 6D. The volumetric registration for this illustration is performed by maximizing the mutual information between the reference MRI volume, and the rest of the volumes in the database iteratively, maximizing:

$$I(V_C, V_{Ref}) = H(V_{Ref}) - H(V_{Ref}|V_C) \quad (7)$$

where $V_C$ is the floating volume (i.e. any volume picked from the database), $V_{Ref}$ is the reference volume, $H(V_{Ref})$ is the Shannon entropy of the reference volume, and $H(V_{Ref}|V_C)$ is the conditional entropy. Rigid registration, optimizing translation and rotation parameters, is utilized in our visualization. The interested reader may refer to [41] for further details on mutual information's usage in medical image registration.

Evaluation Metric

The clinical applicability of a BM-detection algorithm was assessed by measuring (1) the sensitivity and (2) the average number of false lesion-detections for a given sensitivity.

As a screening tool, sensitivity of the system is expected to be high: In a typical deployment scenario of a detection algorithm, the appropriate operating point, maximizing the sensitivity whereas minimizing the average false lesion-detections per patient, needs to be adjusted by a medical expert.

Therefore, we plot our performance metrics (i.e. sensitivity vs average number of false-positive detections per patient—AFP) at various output threshold settings (~0—low likelihood and ~1—high likelihood of metastasis). Accordingly, state-of-art approaches[13][14][18] follow a similar reporting methodology.

Results

The detection framework is validated using 5-fold CV. Folds are generated based on patient, which ensures each patient is located either in a training or testing group for each fold (e.g. datasets from Patient-A are all located either in training or testing group for fold-n) for eliminating the learning bias. Accordingly, the bins included datasets from 31, 31, 32, 32 and 32 patients, respectively. For each CV fold, four bins are used for the training and validation, and a single bin is used for the testing.

Figure 7:
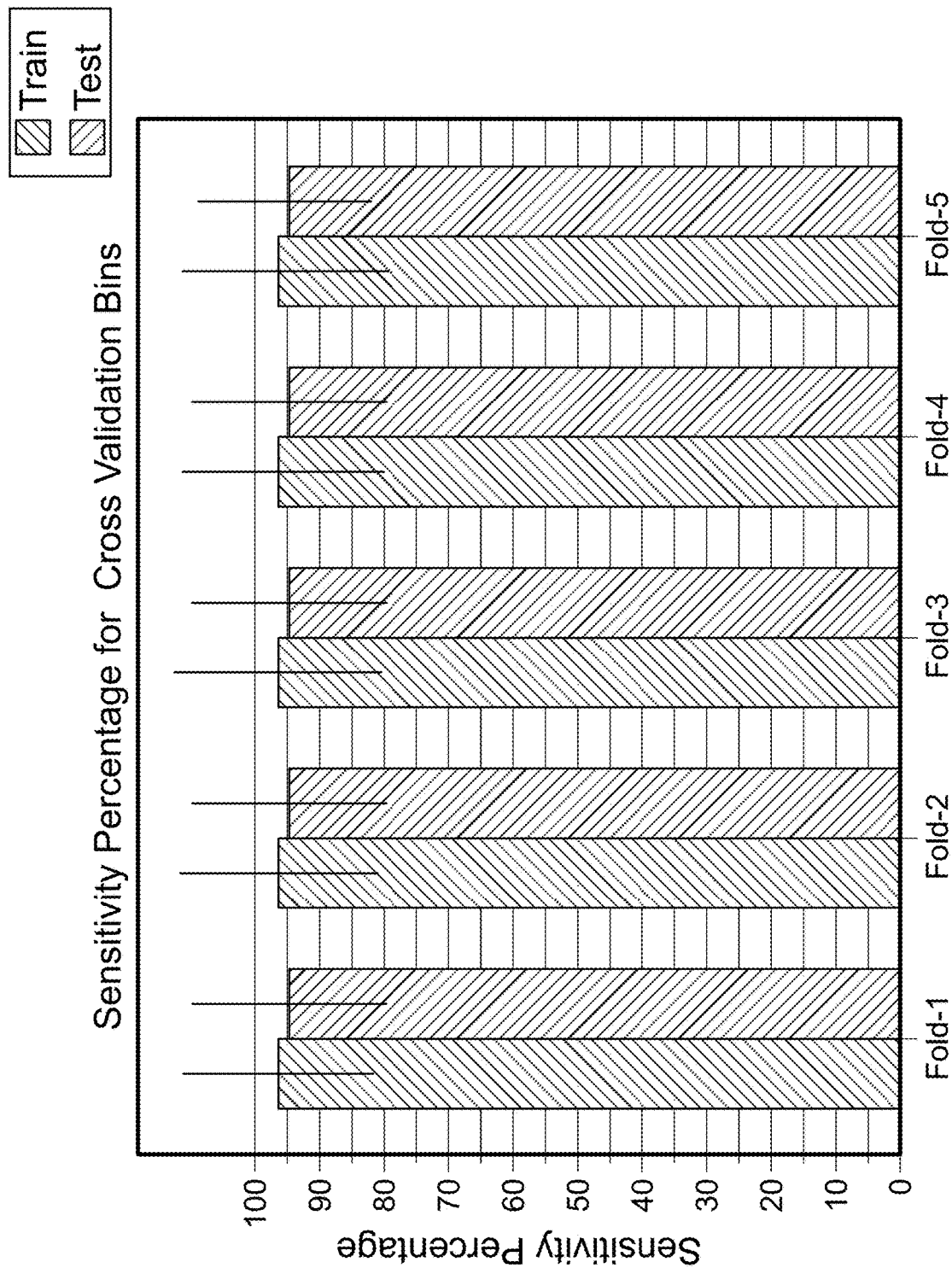
FIG. 7 is a graph of candidate selection procedure's sensitivity percentages for each fold's training (blue, left bar) and testing (silver, right bar) groups are represented. Sensitivity standard deviations are also shown with bold lines on each block.

For the candidate selection stage of the framework, Laplacian of Gaussian parameters are optimized from the training bins with the constraint of setting minimal sensitivity to 95% (see Equation-5). These parameters include (1) minimal and maximal standard deviations for the Gaussian kernel, and (2) the absolute lower bound for scale-space maxima (SSM), also referred to as LoG threshold in the literature [22]. During this optimization: (1) The minimal and maximal standard deviations were searched in the range of [1, 6] mm with the step size of 1 mm, and (2) SSM was searched in the range of [0.5, 2.5] % with the step size of 0.5%. In the utilized image processing library [42], the LoG method's Gaussian filter adapts its kernel radius based on the standard deviation; kernel radius=$\lceil \sqrt{3} \cdot \text{stdev} \rceil$. Table 2 (FIG. 12) summarizes the found optimal LoG parameters and the corresponding Gaussian kernel radius range for each CV fold. The candidate-selection procedure achieved (1) a mean sensitivity of 95.8, where the sensitivity for training and testing groups of each fold are represented in FIG. 7, and (2) produced 72623 candidates on average ($\sigma$=12518) for each 3D dataset. Processing time for each dataset is ~30.6 seconds (using a 3.5 GHz Intel Core i7-5930K CPU.

The framework contained CropNet-b2-16 mm for processing the BM candidates and providing the final detection results. The network processed cubic ROIs with 16 mm edges and each resolution level included two blocks with layers as described in Section.2. The dropout rate was set to 0.15 throughout the network. The optimization was performed using Adam algorithm [43], where the learning rate was 0.00005, and the exponential decay rates for the first and second moment estimates were set as 0.9 and 0.999 respectively. Binary cross-entropy was used as the loss function.

For each fold, CropNet is trained for 20000 batch iterations, where each batch included 130 pairs of positive and negative samples. The optimal version of the network was determined using the minima of moving validation loss average, computed over 30 batch iterations. On average, the training process took 11312 ($\sigma$=183) batch iterations to converge. The implementation was performed using Python programming language (v3.6.8) where the neural network was created and trained via Keras library (v2.1.6-tf) with TensorFlow (v1.12.0) backend. The network's training time for each fold was ~3.5 hours using an NVIDIA 1080ti graphics card with 11 GB RAM.

Figure 8:
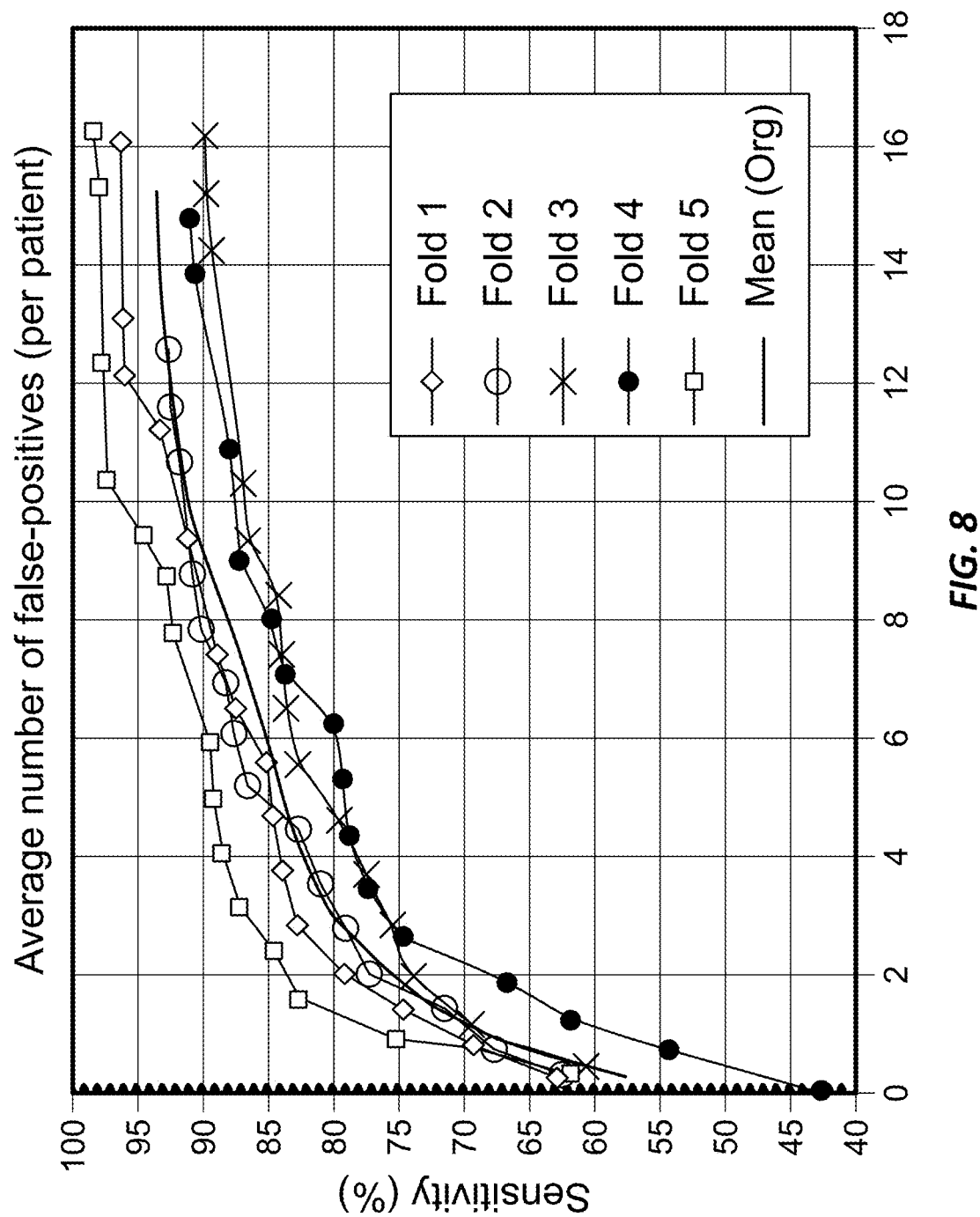
FIG. 8 is a graph of average number of false-positives per patient (i.e., wrongly detected BM lesions for each patient) in relation to the sensitivity is illustrated for each CV fold. The mean curve (shown with bold curve) represents the average of the CV folds.
Figure 10:
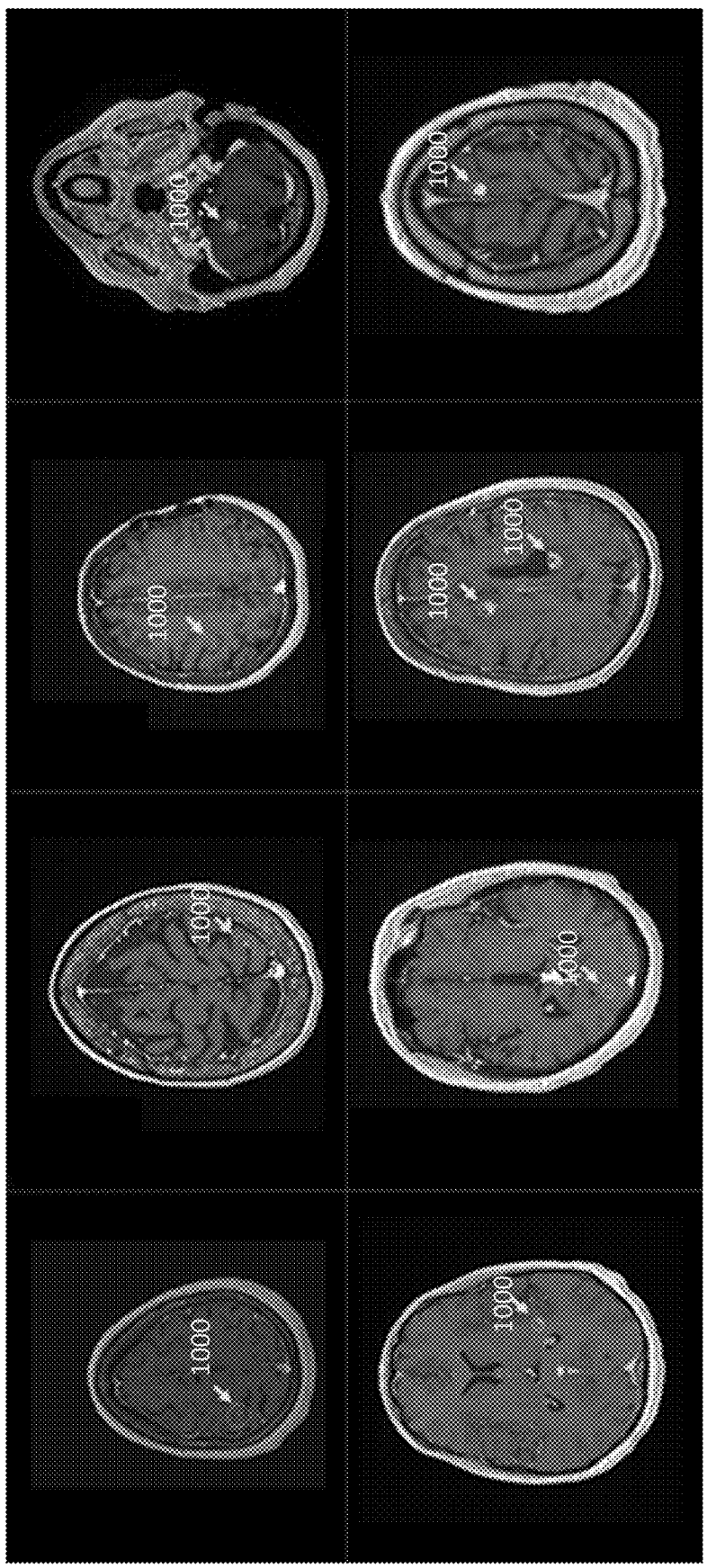
FIG. 10 illustrates the framework output; white circles centered by the BM detections are rendered (yellow arrows 1000 are added to the figure for the readers' convenience).

The average number of false-positives (i.e. false lesion-detections) per patient (AFP) were computed in connection to the sensitivity of the framework for each CV fold, where the sensitivity of the framework was adjusted via setting a threshold at CropNet's response. AFP was computed as 9.12 per patient with a standard deviation of 3.49 at 90 percent sensitivity. At lower sensitivity percentages, AFP was computed as 8.48 at 89%, 7.92 at 88%, 7.29 at 87%, 6.64 at 86%, and 5.85 at 85% (see FIG. 8). FIG. 10 illustrates sample output screens for the deployed BM detection framework.

Figure 9:
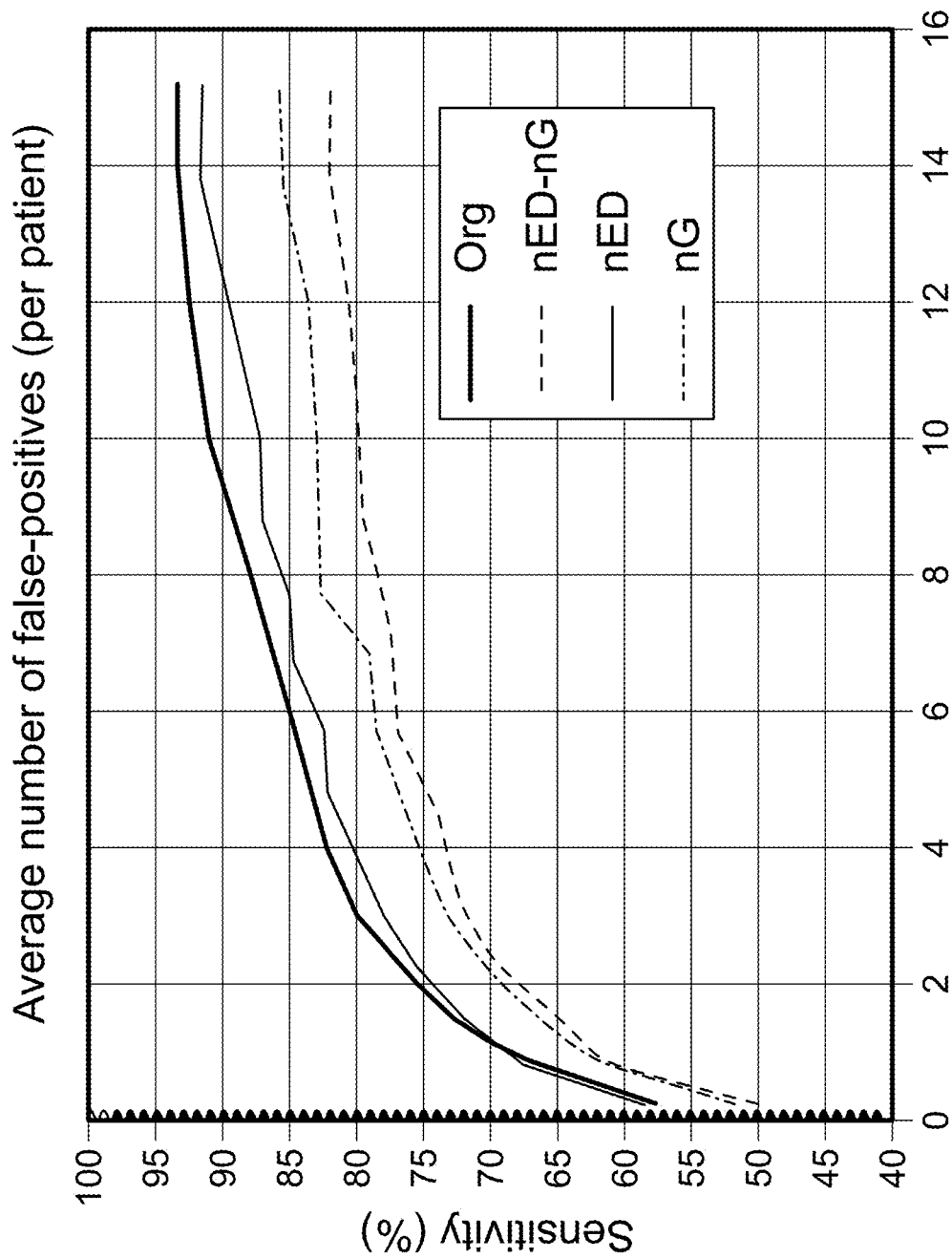
FIG. 9 is a graph of average number of false-positives per patient in relation to the sensitivity is illustrated for the proposed solution with all augmentation stages (Org), and nED-nG (no random elastic deformations or gamma corrections), nG (no random gamma corrections) and nED (no random elastic deformations) configurations.

To illustrate the impact of the proposed augmentation procedures, the CV study (with the same folds) was performed on (1) the proposed framework where both random elastic deformation and random gamma correction augmentations are excluded—nED-nG, (2) only the random elastic deformation augmentations are excluded—nED, and (3) only the random gamma correction augmentations are excluded—nG (see FIG. 9). For these configurations, AFP values for 80, 82, 85 and 90 sensitivity percentages are reported in Table 3 (FIG. 13).

Discussion and Conclusion

The ablation study, performed to visualize the contributions of random elastic deformations and gamma corrections during the augmentation procedure (see Table 3), suggests that while both augmentation stages are valuable, positive contribution of random gamma corrections is relatively more prominent; the framework manages to achieve 90 percent sensitivity with the exclusion of elastic deformations where the AFP value raises to 12.33 (from 9.12 of the original setup). On the other hand, the exclusion of the random gamma corrections sets a limit for the framework's sensitivity at ~85 percent (see FIG. 9). Elimination of both augmentations (nED-nG) leads to a configuration with ~82 percent peak sensitivity while producing AFP of 14.33.

Table 4 (FIG. 14) provides an overview of the databases, acquisition types, neural network architectures, validation strategies and detection accuracies of some of the prominent CNN based BM-detection/segmentation approaches for 3D MRI, published over the recent years. From these, [14] and [18] requires multiple MRI sequences during the BM-segmentation/detection process, whereas [16] benefited from multiple sequences for the training and validation. Our framework trained and validated for a single type of MRI sequence, T1c, and requires only this type of study during its decision-making process.

The dimensional properties of the BM included in a detection study are critical for determining the clinical applicability of a proposed solution. This is due to the fact that smaller lesions are harder to identify even by highly trained neuroradiologists. Consequently, they may greatly benefit from a system trained and validated specifically for that type of data. As illustrated in Table 4, our study employed a BM database that included relatively smaller BM lesions compared with the referenced studies; the smallest BM average volume in comparable studies is 672 mm$^3$ [16], whereas the BM average volume in this study is only 159.58 mm$^3$.

BM-detection and segmentation databases used in our study and in other comparable studies (as shown in Table 4) are limited with respect to number of cases; they all consist of some hundreds of patients. Estimating the accuracies of such machine learning approaches, trained with a limited amount of datasets, can gain significantly from the usage of CV, as the method minimizes the error of algorithm's predictive performance evaluation [44]. Therefore, we found it valuable to emphasize the validation schemes of comparable studies in Table 4.

The study introduced the following: (1) Sensitivity constrained LoG BM-candidate selection, (2) random 3D Simard elastic deformation augmentations (Simard deformation field used for medical-image augmentation for the first time to our knowledge), (3) volumetric random gamma correction augmentations for MRI, and (4) a parametric CNN for processing cubic volumes of interests. More importantly, all of these components are put into a sound framework that can be utilized for various detection applications in medical imaging.

The performances of machine-learning algorithms, including the CNNs, heavily depend on their hyperparameter settings [45]. Accordingly, some of the BM-segmentation studies, such as [13] and [14], provided a set of analyses on parameter tuning. The introduced framework's performance also relies on proper setup of multiple parameters, including (1) edge length and the block count of CropNet, (2) random gamma correction range, and (3) elastic deformation parameters, which were found empirically and individually. Therefore, multivariate optimization of these may further improve the accuracy of the framework.

The study utilized CropNet-b2-16 mm, containing 2 processing blocks per level. Since the number of convolutional layers for the given architecture is significantly low (<<100), the introduced system is not prone to vanishing/exploding gradients problem as described in [39]. Thus, skip connections in forms of bypassing (e.g. Highway Networks [46], ResNets [47], etc.) or direct paths (e.g. DenseNet [48]) are not part of the given architecture. Therefore, (1) the impact of using high block counts, (2) the architectural enhancements (in forms of skip connections) required to sustain/improve the accuracy level with these deeper architectures, and (3) the validation of this improvement in connection to the BM detection are topics for a future study.

Transfer learning, enabling the utilization of CNNs pre-trained with relatively large scale image databases (e.g. ImageNet [49]), has been shown to be effective in a variety of imaging applications [50]. However, the CNNs used for transfer learning tasks are commonly pre-trained with 2D images. Accordingly, in 3D medical imaging, transfer learning is commonly performed via recurrent neural networks (RNNs) [51], which briefly process a given 3D image via slice-by-slice fashion. The applicability of RNNs in the described framework can be investigated in the future.

As given in Table 1, the study was performed on datasets with (1) pixel sizes ranging from 0.43 to 1.0 mm and (2) slice thicknesses ranging from 0.8 to 1.0 mm, where the data was resampled to (1 mm×1 mm×1 mm) voxels at preprocessing stage. The results were not compiled for delineating the impact of original pixel size and slice thickness on overall system performance; the validation of the proposed system concerning those and additional scanner parameters (e.g., imaging frequency, etc.) can also be performed in a future study.

The introduced framework can be extended for segmentation of the metastatic mass lesions. The network's contracting layers can be appended with a symmetric set of expanding layers as in [27] or [25], and its loss function can be changed to Dice similarity coefficient, or another image segmentation metric [52], to perform segmentation. Alternatively, previously defined BM-segmentation algorithms can be modified to use the proposed detection framework in their preprocessing stages.

The proposed data augmentation pipeline uses random gamma transformations and elastic deformations to capture the BM intensity and shape variabilities. The strategy mimics the kernel density estimation with Parzen windows [53], as the probability densities of the BM with respect to intensity and shape are generated from a small set of actual BM (932 BM) and their ranged uniform variations to deploy a uniform kernel density. For density estimation problems, it is also common to use Gaussian kernel densities [53], which would translate to (1) using gamma corrections randomly picked from a normal distribution centered at 1 (i.e., γ=1 gives the original image), and (2) elastic deformations randomly picked from a bivariate distribution centered at (0,0) (i.e. σ=0 and α=0 implies null Simard deformation field). The impact of kernel density function to the final accuracy is a topic for a future study.

Example 2

The sharing of medical images between institutions, and even inside the same institution, is restricted by various laws and regulations; research projects requiring large datasets may suffer considerably as a result. Corresponding limitations might be addressed by an abundant supply of synthetic data that (1) is representative; the synthetic data users could produce comparable research results as the original data users, and (2) does not closely resemble the originals (i.e., to protect the patient privacy). This manuscript introduces a framework to generate data with the given aspects by advancing the Generative Adversarial Network (GAN) ensembles. First, an adaptive ensemble scaling strategy with the objective of representativeness is defined. Next, a sampled Fréchet Distance-based constraint is described to eliminate poorly converged ensemble member candidates; hence, to ensure a healthy ensemble growth. Finally, a mutual information-based validation metric is embedded into the described framework to confirm the shared synthetic images' visual differences with the originals. The applicability of the solution is demonstrated with a case study for generating 3D brain metastasis (BM) region data from T1-weighted contrast-enhanced MRI studies. A previously published BM detection system was reported to produce 9.12 false-positives at 90% detection sensitivity with the original BM data. By using the synthetic data generated with the proposed framework, the system produced 9.53 false-positives at a similar sensitivity level. Achieving a comparable performance with the sole usage of synthetic data unveils a significant potential to eliminate/reduce imaging data size-related limitations in the near future.

Introduction

The neural-networks with deeper (i.e., with higher numbers of layers) and progressively more sophisticated architectures revolutionized the field of computer vision over the last decade[1]. These mathematical models, also referred to as Deep Neural Networks (DNNs), were utilized for various medical imaging applications including the segmentation/extraction of regions of interests, the detection of formations, and the classification of medical images and/or their parts[2,3]. As DNNs are highly parametric (i.e., requiring a vast amount of parameters to be optimized), the accuracy and generalizability of the developed models heavily depend on the scale of the used datasets[4]. However, the sharing and usage of medical imaging data are limited due to various laws and regulations, which are necessities as patient privacy, and the institutions' data ownership rights need to be protected[5]. While there are multiple successful initiatives for aggregating multi-institutional public datasets[6-8], access to large-scale datasets collected from selected modalities representing specific medical conditions is not always possible[9].

One way to partially tackle the data deficiency problem is augmenting the institution's own limited imaging data with the synthetic ones, commonly generated based on the originals. Generative Adversarial Networks (GANs)[10], which exploits adversarial loss functions to generate realistic synthetic data[11], were utilized for the augmentation of medical imaging data sets previously[12-16]. However, as reported by Bowles et al.[13], GANs generated data is commonly not representative enough to replace the original data; thus, they were used as a complementary tool to maximize the gain from the original data by smoothing the information domain with more samples. Furthermore, GANs have the potential to generate synthetic images that are identical with or closely resembling the original images[17,18], making their outputs not always sharable with other institutions.

The goal of this paper is to introduce a framework to generate synthetic data that is (1) representative, the synthetic data users can produce comparable results with the original data users, and (2) not closely resembling the originals; hence, it is sharable. Accordingly, the ensemble of GANs approach[19], having the premise of improving the generalizability of GANs, is further advanced with the aforementioned aspects. First, an adaptive ensemble scaling strategy is introduced with the objective of representativeness. Next, the ensemble membership is constrained by a novel sampled Frechet distance (SFD) metric for eliminating poorly converged candidates to allow healthy ensemble growth. Finally, A mutual information-based verification stage is embedded into the framework to ensure the generated data does not include identical, or closely resembling, samples with the originals. In an ideal deployment scenario, multiple institutions would generate synthetic datasets with the presented approach, then share it with other institutions; this would enable research projects to be performed with vast synthetic datasets vetted to represent their originals.

Materials and Methods
Vanilla GAN and the GAN Ensemble

The GAN is a generative machine learning model used in various applications of computer vision including the image synthesis[21]. The vanilla GAN is formulated via two neural network (i.e., generator and discriminator) that are optimized in tandem for a minimax problem:

$$\min_G \max_D V(D,G) = E_{x \sim p_{data}}[\log D(x)] + E_{z \sim p_{noise}}[\log(1 - D(G(z)))], \quad (8)$$

where (1) D and G are the discriminator and synthetic data generation models, (2) $p_{data}$ is the unknown probability distribution function (PDF) for the real data, and (3) $p_{noise}$ is the PDF for the generator's noise type input (typically uniform or Gaussian). Over the recent years, various GAN formulations modifying the network architectures and/or loss functions were proposed[22]. Depending on the target data type and problem domain, some formulations are shown to be more applicable than the others[23]; hence, the report leaves the selection of the GAN type as a design choice to the readers' discretion.

The ensemble of GANs is an algorithm, where multiple GAN models (regardless of the GAN formulation) are trained using a single training dataset, then the synthetic data is generated via a randomly picked ensemble member for each synthetic data request[19,24]. It was shown that the ensemble of GANs outperforms a single GAN with respect to the information coverage, computed using Wilcoxon signed-rank test[25], and a manifold projection distance metric defined in[19]. The results outline the common traits of ensembles; (1) the avoidance of overfitting due to multiple hypotheses covered by its components, (2) reduced chance of stagnating at local optima as each component runs its optimization process individually, and (3) improved representation of the optimal hypothesis since the combination of different models commonly expands the solution search space[26,27]. The approach was further customized by (1) integrating ensemble members with similar network initializations to speed up the training process (self-ensemble of GANs), and (2) using discriminator feedbacks to detect/improve GANs with limited information coverage (the cascade of GANs)[19].

Technical Contributions: Objective Oriented Ensemble Formulation
Ensemble Growth Strategy The commonly used optimization goals for the generative algorithms, such as (1) minimizing information divergence from the original data[28] (e.g., computed via Jensen-Shannon, Kullback-Leibler), (2) generating subjectively highly realistic outputs (e.g., Visual Turing Test[29]), or (3) information coverage optimization (e.g., Wilcoxon signed-rank test), do not necessarily lead to the generation of research-wise representative data[13]: The representativeness in this context is the ability to produce comparable research results using the synthetic data as with the original data. The complex metric of representativeness would require the execution of a complete validation study with an external algorithm for a new set of data at each optimization step; thus, it is not part of any generative approach, including the ensemble of GANs. In this study, we propose an adaptive growth strategy for GAN ensembles to address this objective by introducing an additional computational overhead as:

The baseline performance using an algorithm executed on the original data is defined as, $$\vartheta_o = P(A, D_o), \quad (9)$$

where (1) A is the algorithm, referred to as the validation model (e.g., cardiac segmentation, liver tumor detection, etc.), (2) $D_o$ is the original data set, (3) P is the evaluation methodology (e.g., N-fold cross-validation, bootstrapping, etc.), and (4) $\vartheta_o$ is the baseline performance value (e.g., Dice score, the area under the receiver operating characteristic curve, etc.).

Temporary ensemble performance is described as $$\vartheta_i = P(A, D_i = E_i(D_o)) \text{ with } |D_i| = |D_o| \quad (10)$$

$$\forall d \in D_i E_i \overset{R}{\leftarrow} e \text{ and } d = e(z \sim p_{noise}) \quad (11)$$

where (1) $\vartheta_i$ is temporary ensemble performance, (2) $D_i=E_i(D_o)$ is the data set generated by the ensemble's ith iteration with the same size as the original data, and (3) each data d in $D_i$ is generated by a random member of $E_i$ called e; receiving noise type input z.

The growth of the ensemble can be halted when the ensemble performance becomes comparable with the baseline performance; $|\vartheta_o-\vartheta_i|\leq\varepsilon$, where ε gives the acceptable performance gap threshold. Divergence of the performance with the growth of the ensemble might indicate (1) improper GAN formulation selection or its parametrization, and/or (2) inadequate original training data; therefore, they need to be reconsidered.

Ensemble Member Constraint

While the proposed ensemble growth strategy is intuitive, it causes a significant computational overhead due to the iterative calculation of the temporary ensemble performance. The issue could be partially addressed by computing the performance metric periodically (e.g., after every ten additional GAN members) instead of each iteration. However, the number of iterations could still be high depending on the individual performances of ensemble members[27]: Diverged or mode-collapsed members would fail to produce plausible synthetic samples making the ensemble overgrown and inefficient.

The Fréchet Inception Distance (FID)[30] was introduced for evaluating a GAN performance; the Fréchet distance between the original and synthetic data's lower-dimensional manifold representations extracted from the Inception model[31] is used for the model assessment. The FID allows the robust detection of mode-collapsed and diverged GAN models[32]. However, as the Inception network is trained for two-dimensional color images of random scenes in ImageNet[33], the metric cannot be used for the evaluation of models that produce any-dimensional (e.g., 3D, 3D+T, etc.) medical imaging data. Accordingly, we propose a sampled Fréchet Distance (SFD) that is mostly identical with the FID whereas differing with respect to its inputs as;

$$f^2((m_r,C_r),(m_g,C_g))=\|m_r-m_g\|_2^2+Tr(C_r+C_g-2Re(C_rC_g)^{1/2}), \quad (12)$$

where (1) $(m_r, C_r)$ and $(m_g, C_g)$ give original and generated data's sampled mean and covariance tuples respectively, and (2) Re gives the real components of its input. Unlike the FID (which uses lower-dimensional representation extracted from a pre-trained Inception model), the metric uses the flattened vector representations for the down-sampled original and synthetic data with the assumption of these having multivariate Gaussian distributions. Hence, it can be used for evaluating any generative model by verifying $f^2<\omega$, with $\omega$ giving the maximum allowed SFD between synthetic and original samples.

Visual Resemblance Test

The shared synthetic data is strictly forbidden to be identical with the original data for protecting the patients' privacy. Therefore, each synthetic data sample needs to be compared with the original data set. While voxel-wise image comparison (e.g., mean square difference, etc.) might be adequate to eliminate synthetic samples having high visual similarity with the originals, it would not necessarily detect statistically dependent samples (e.g., intensity inversed version of an image, etc.). Thus, we propose a mutual information based metric defined for each synthetic sample as:

$$I_{max}=\mathrm{argmax}_{n\in\{1,N\}}(H(T(d_g))-H(T(d_g)|d_{o,n})), \text{ and}$$
$$I_{max}\leq\varphi, \quad (13)$$

where (1) N is the number of original training samples (i.e., $|D_o|$), (2) $d_g$ is the synthetic sample, (3) $d_{o,n}$ is the nth original sample, (4) $T(d_g)$ is the geometrically transformed synthetic sample (i.e., translation, rotation), (4) $H(T(d_g))$ is the Shannon entropy of the synthetic sample, and (5) $H(T(d_g)|d_{o,n})$ is the conditional entropy. Accordingly, $I_{max}$ gives the maximum mutual information (MI) between the synthetic sample and all real samples, and φ is the maximum acceptable MI; a synthetic sample with $I_{max}>\varphi$ is not shared due to its high similarity with an original sample(s).

The Framework

The described ensemble growth strategy, member constrain and visual resemblance test can be integrated into a framework for the synthetic data generation:

The baseline performance ($\vartheta_o$) is computed using a validation model (A) on the original data set ($D_o$).

A proper GAN formulation is chosen for the target data type. The ensemble is grown with the selected type of GANs to produce synthetic samples having SFD with the originals less than a threshold (ω).

Step-2 is repeated iteratively until the baseline performance metric is achieved with an acceptable performance gap (ε) using the ensemble generated data. If the temporary performance ($\vartheta_i$) diverges, then the GAN type and co are needed to be reconsidered.

The matured ensemble's output is validated using the visual resemblance test; the synthetic samples having low MI ($\leq\varphi$) with the original data set are shared.

Case Study: Brain Metastatic Region Data Generation

Problem Definition

The BMs are the most common form of brain cancer, where 20 to 40% of cancer cases have this complication. The metastatic lesions can vary significantly in size and appearance; early forms of the disease present as punctate foci measuring as small as 1 mm in diameter. In [20] (see Example 1 above), the authors have proposed an approach for the detection of particularly small BMs, with diameters of ≤15 mm, for the gadolinium-enhanced T1-weighted 3D MRI. Briefly, the method first determines all BM candidates using an information-theory based algorithm. Next, the candidates are processed using a parametrized deep-neural-network formulation (CropNet) to give the final BM detections; the CropNet learns the statistical representation of a BM from isometric metastatic region volumes with 16 mm edge length and differentiates it from any other similar size volumetric region extracted from the brain image. The approach was validated using five-fold-cross-validation (CV) on 217 datasets acquired from 158 patients including 932 BMs in total. It was reported to produce 9.12 average number of false-positive BMs for 90% detection sensitivity.

Figure 15A:
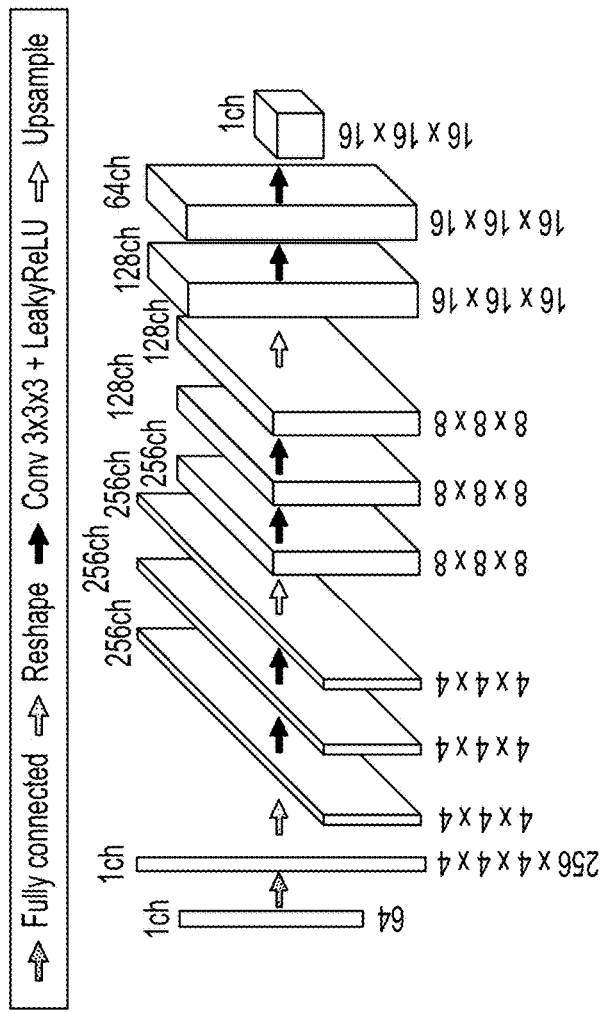
FIGS. 15A-15B are diagrams illustrating example networks according to implementations described herein. The generator (FIG. 15A) and discriminator (FIG. 15B) networks of the used 3D DCGAN: Classical contracting and expanding architectures are deployed with 3D convolution layers.
Figure 15B:
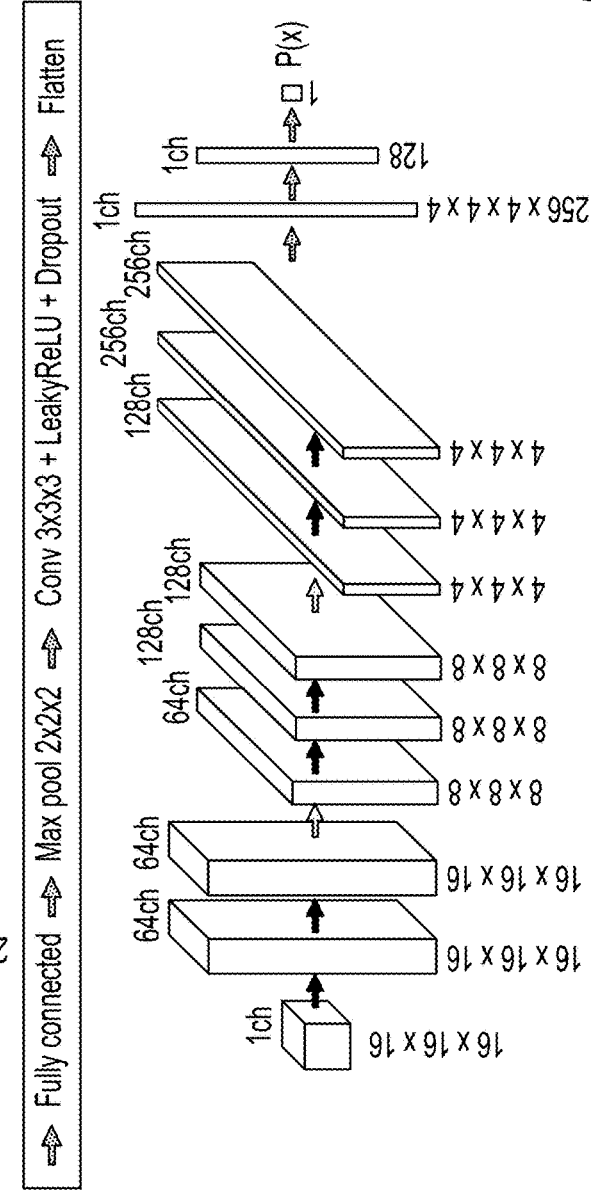
Figure 16B:
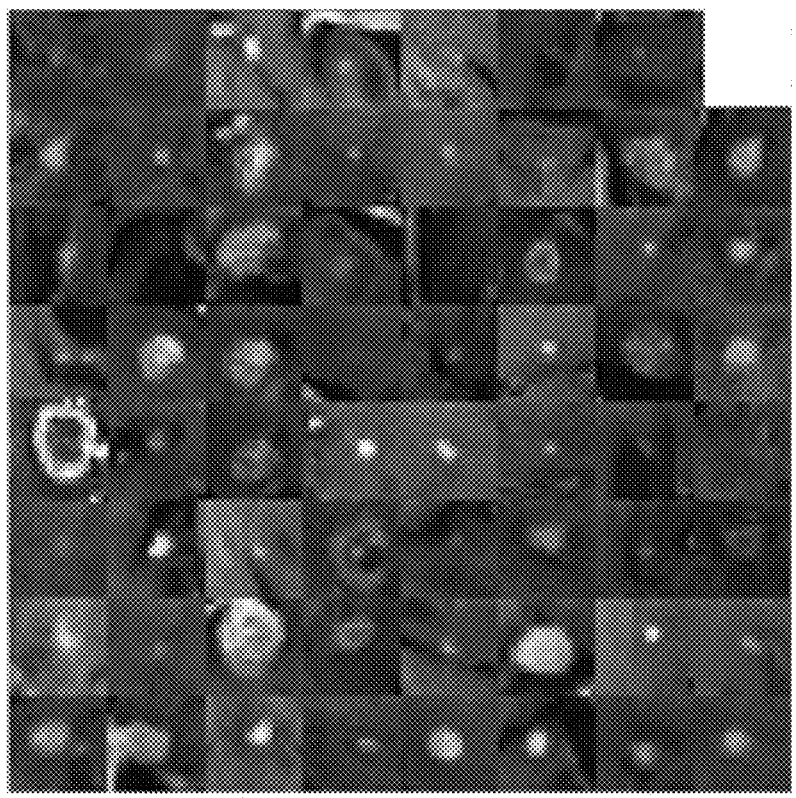
FIGS. 16A-16B illustrates mosaic of mid-axial slices of (FIG. 16A) real and (FIG. 16B) DCGAN-generated synthetic BM region volumes.
Figure 16A:
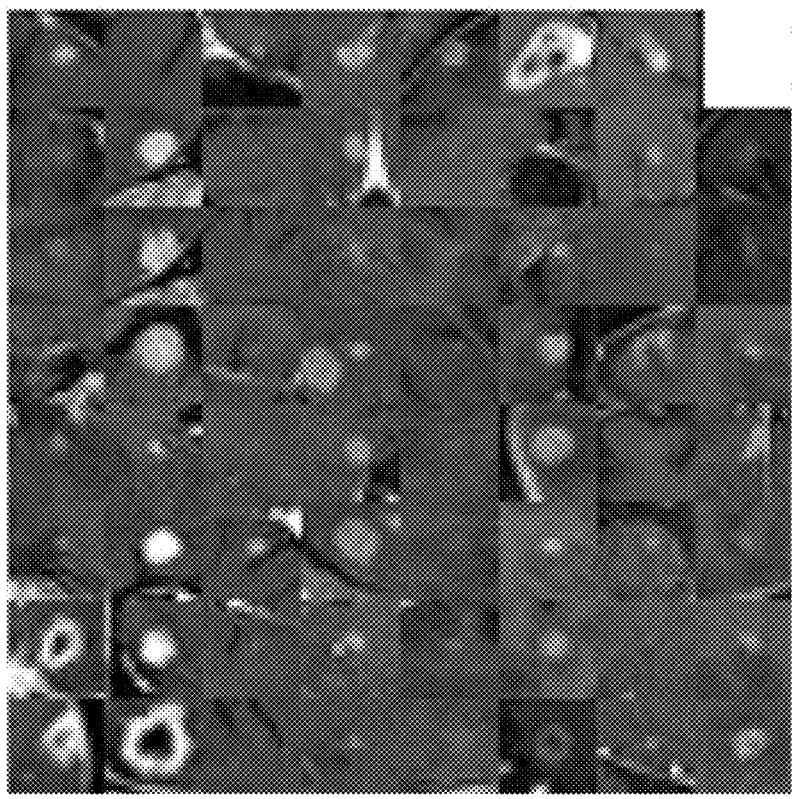

In the detection study, while negative samples were abundant (random volumetric extractions from brain images), BM regions were limited (9323D volumes with 16 mm edges). Accordingly, the purpose of this case study is to generate synthetic BM regions using the constrained GAN ensemble framework. The ensemble growth objective is set as the detection system trained with the synthetic samples produces a comparable number of false-positives for the given sensitivity level using the same dataset used in [20]:

A: The BM detection algorithm, $\vartheta_o$: 9.12 false positives at 90% detection sensitivity, $D_o$: 932 BM region volumes from 217 datasets P: 5-fold CV $\quad (14)$ Framework Setup and Parameters
GAN Setup In this case study, deep convolutional GANs (DC-GANs)[34] were utilized as the ensemble members for generating 3D brain metastatic regions segmented from T1-weighted contrast-enhanced MRI. The formulation was chosen as it has been successfully deployed for medical image synthesis in numerous previous studies[12,15,35,36]. The DCGAN was originally designed for 2D images; hence, we adapted it for 3D by (1) modifying the generator (G) to produce 16×16×16 volumes that represent cropped BM regions, and (2) modifying the discriminator (D) to classify volumetric input type. The implemented DCGAN architecture is shown in FIGS. 15A-15B, and some examples for the real and DCGAN generated synthetic BM samples are shown in FIGS. 16A-16B.

Data Preprocessing

All datasets were resampled to have isotropic (1 mm×1 mm×1 mm) voxels. The voxel values were normalized to [0, 1] range, where the maximum and minimum intensity voxels for each dataset had the normalized values of 1 and 0 respectively.

Parameters

The DCGAN type ensemble member candidates were trained where, (1) binary-cross entropy type loss was used for the discriminator and generator networks (as in [34]), (2) Adam algorithm[37] was used for the network optimization, (3) learning rates for the discriminator and generator networks were set as 0.00005 and 0.0003 respectively, (4) the dropout rate of the discriminator network was 0.15, (5) leaky ReLU units' alpha values were 0.1 for both of the networks, and (6) 1500 training epochs were executed with batches each consisting of 8 pairs of positive and negative samples.

Figure 17A:
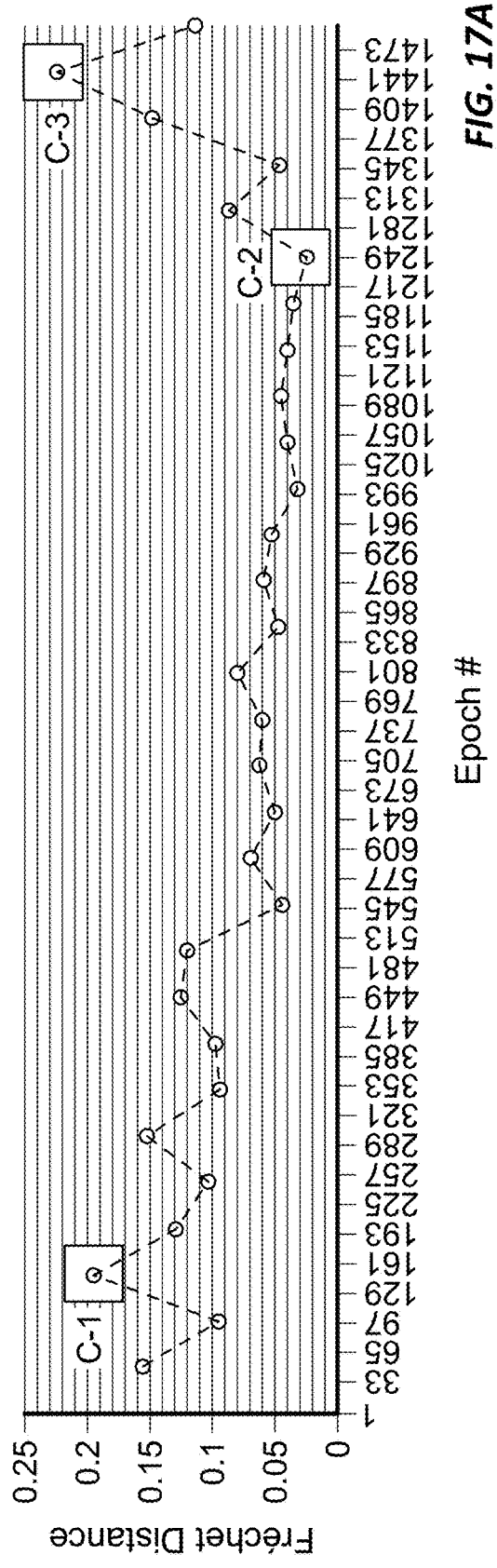
Figure 17B:
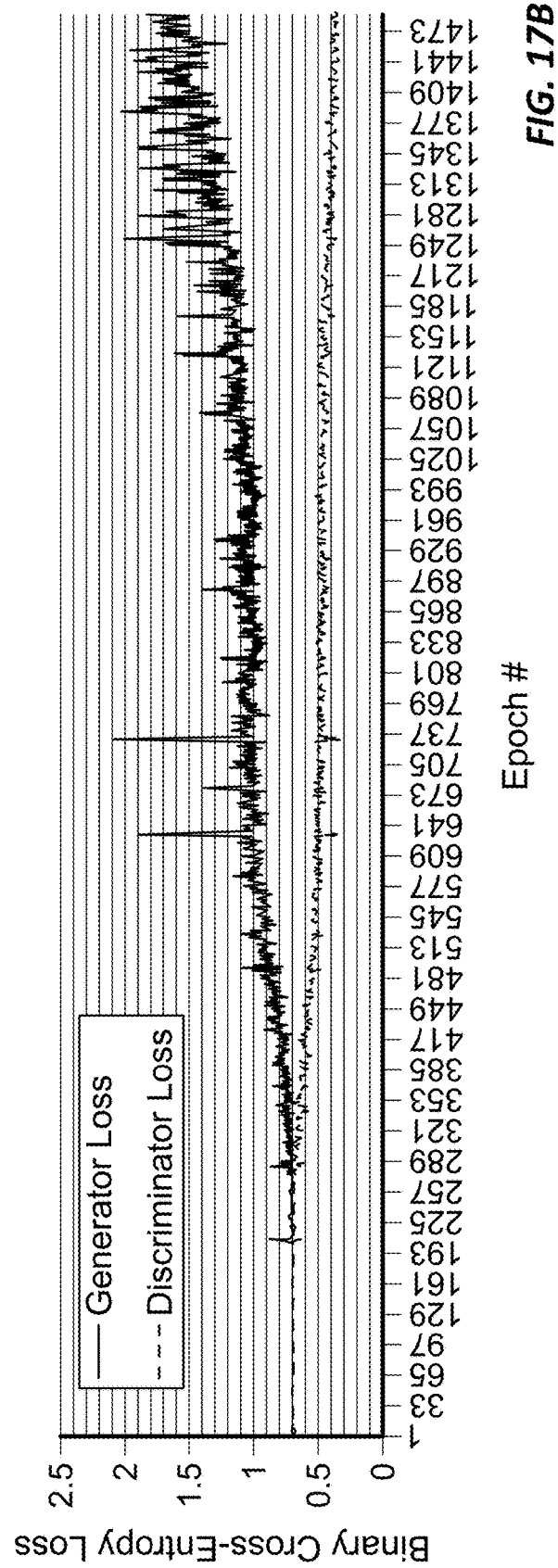
Figure 18A:
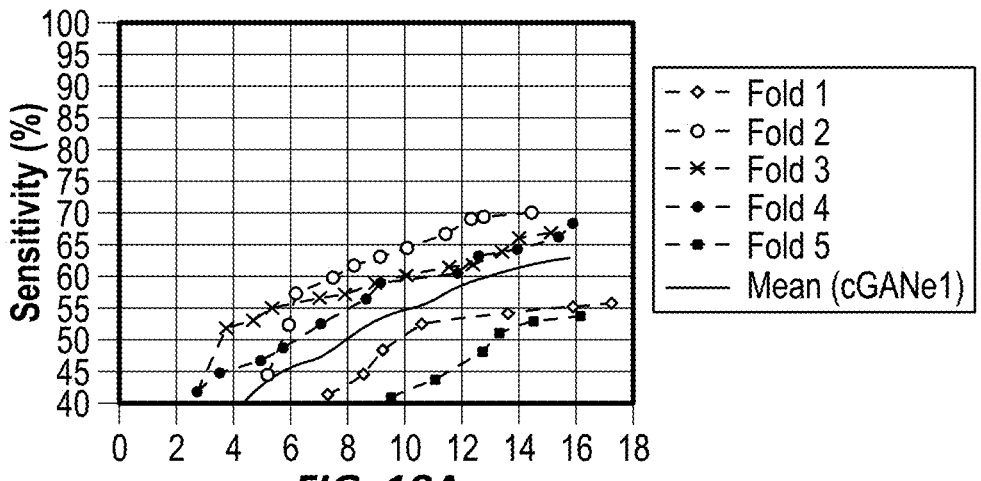
FIGS. 18A-18H are graphs of AFP in relation to the detection sensitivity.
Figure 18B:
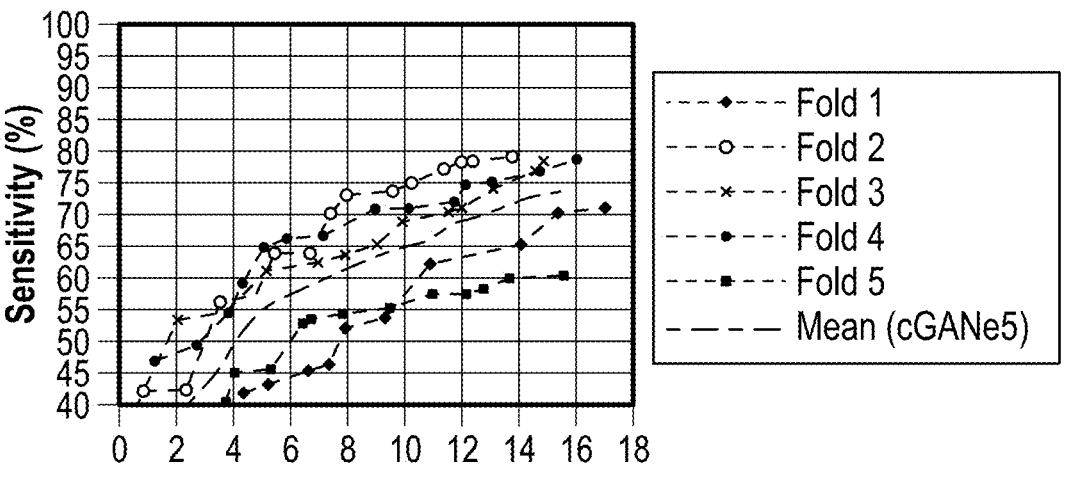
Figure 18C:
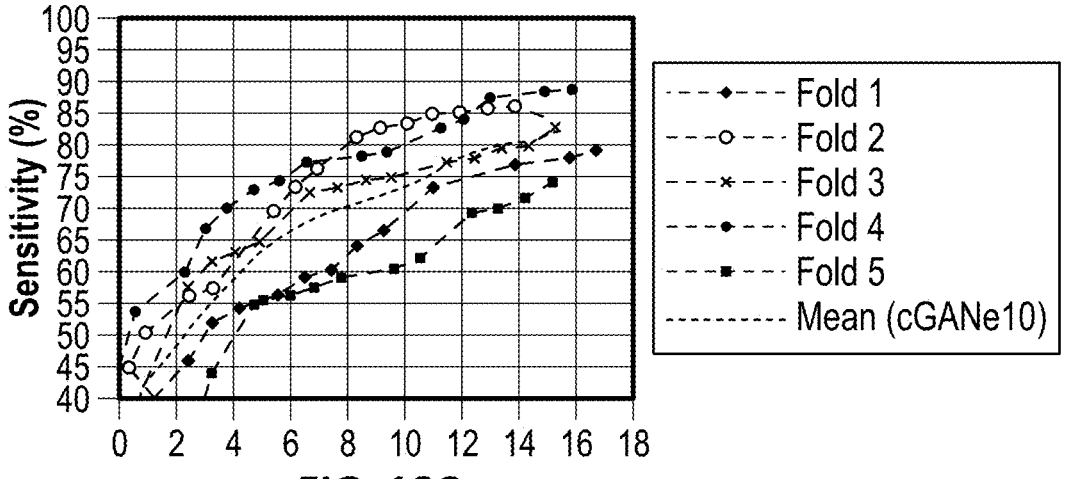
Figure 18D:
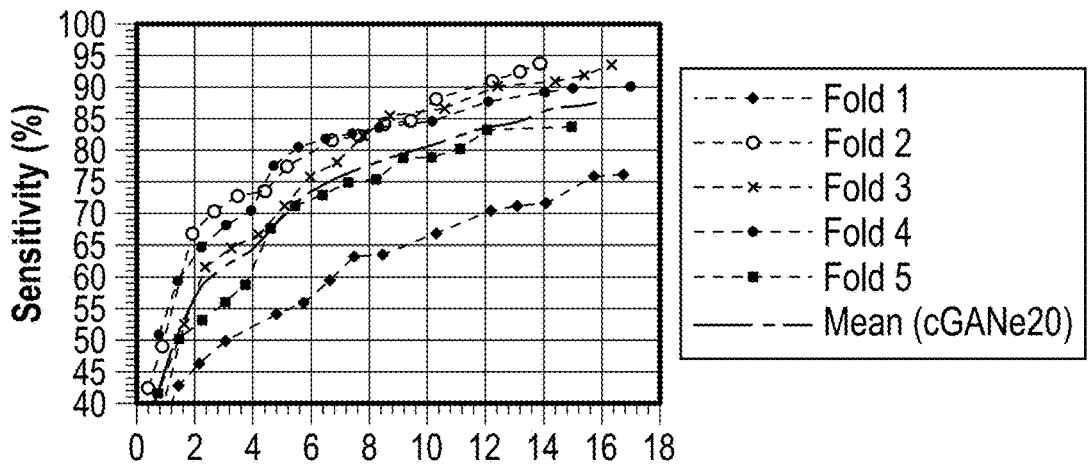
Figure 18E:
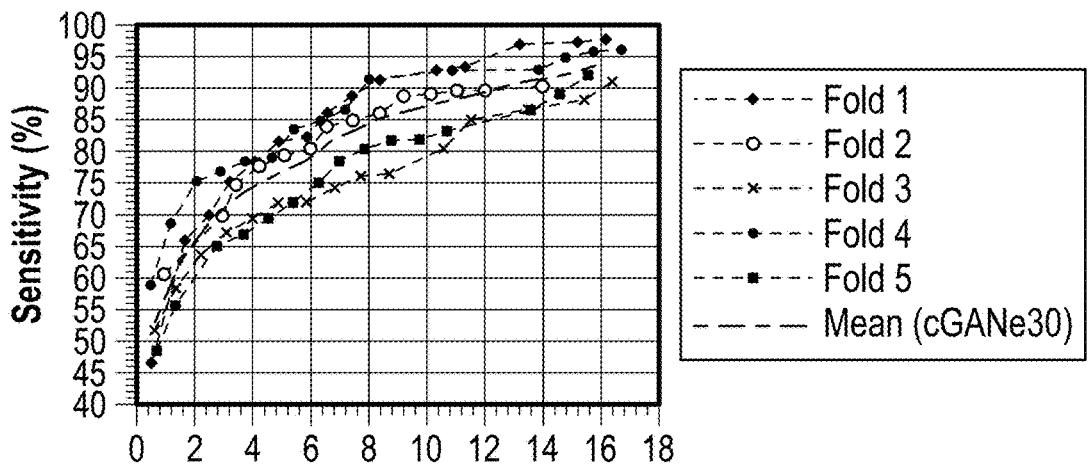
Figure 18F:
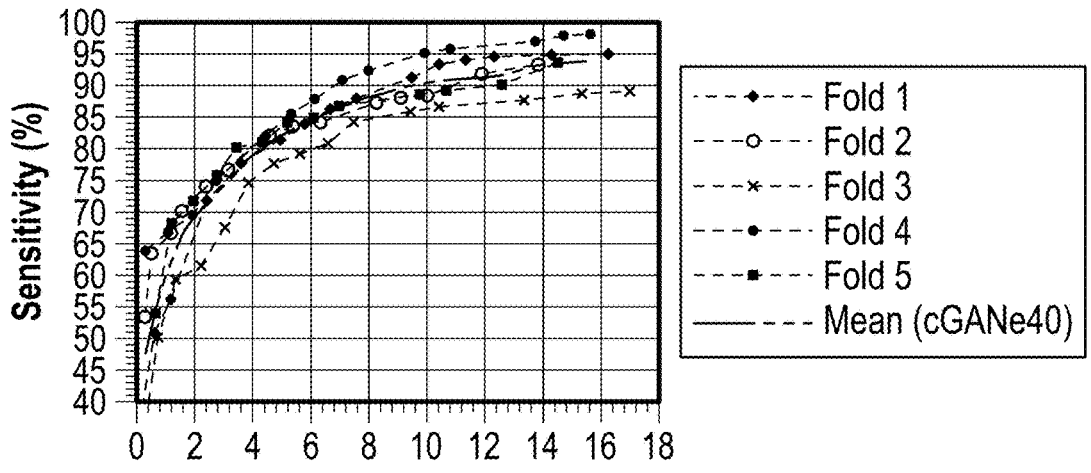
Figure 18G:
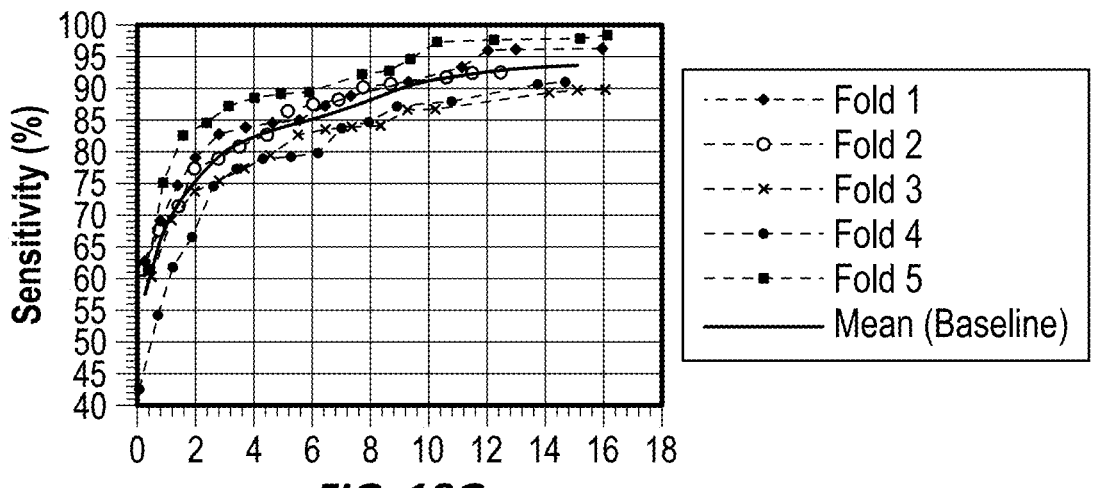
Figure 18H:
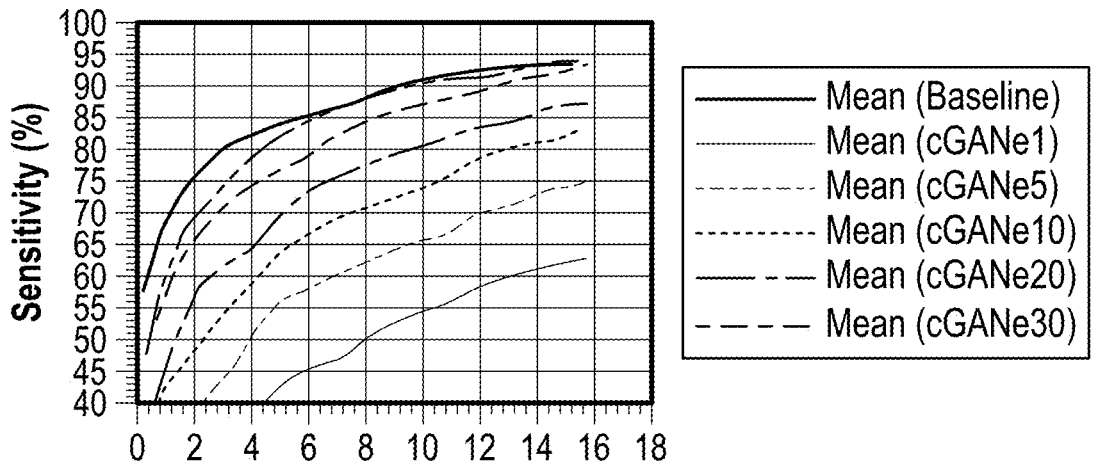

For a given member candidate, to compute the mean and covariance estimates of its synthetic data ($m_g$, $C_g$), 2000 synthetic samples were generated by its generator in every 50 epochs of the training, whereas the real data statistics ($m_r$, $C_r$) were computed using the original data prior to the training. The member candidates that generated synthetic data having SFD of less than $\omega=0.04$ were added into the ensemble (see FIGS. 17A-17C).

The acceptable performance criteria for the BM detection algorithm, trained using the synthetic data generated by the ensemble, was set as 10.12 false positives at 90 percent BM-detection sensitivity: Acceptable performance gap (E) was an additional false-positive with respect to the baseline performance $\varepsilon_o$.

Identification of a patient based on a BM region volume is not likely as the area spans a very limited area. However, to have a glance of the visual resemblance test, the generated sharable samples were allowed to have MI with the original data less than $\varphi=0.5$, where the transformation domain (T) kept empty due to the simplicity of the target data.

Results
Validation Study

The performance of the BM detection algorithm using the synthetic data, generated by the proposed framework, was validated using a five-fold CV: 217 datasets acquired from 158 patients were patient-wise divided into five folds of 31, 31, 32, 32 and 32 patients respectively. For each fold, (1) the other four folds were used for generating the constrained GAN ensemble (cGANe), (2) synthetic data produced by the ensemble was used for training the BM detection algorithm, and (3) and the original data in the selected fold was used for the testing. The average number of false positives (AFP) with respect to the system's detection sensitivity is represented for the ensembles with the sizes of 1, 5, 10, 20, 30, and 40 DCGAN models (i.e., cGANe1, cGANe5, cGANe10, cGANe20, cGANe30, and cGANe40) in FIGS. 18A-18H. The information is summarized for the 75, 80, 85, and 90 percent detection sensitivities in Table 5 (FIG. 21).

Figures 19A, 19B:
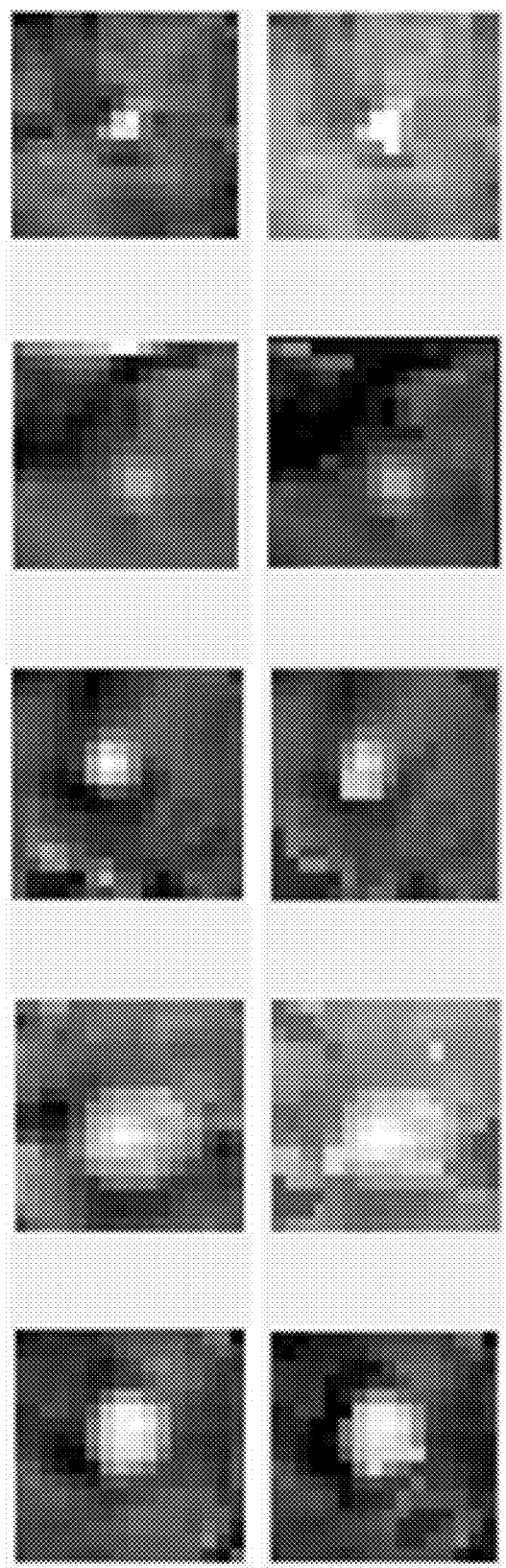
FIGS. 19A-19B illustrates mid-axial slices of some originals (FIG. 19A) and synthetic samples that were eliminated due to high resemblance to those (FIG. 19B).

The visual resemblance test eliminated 5.7% of the 2000 synthetic samples. In FIG. 19, some examples for these eliminated synthetic images and the corresponding original images are shown.

The proposed solution was implemented using the Python programming language (v3.6.8). The neural network implementations were performed using Keras library (v2.1.6-tf) with TensorFlow (v1.12.0) backend. The training of each DCGAN was done in ~1.25 hours, where a DCGAN satisfying the SFD constraint was generated in ~2.15 hours on average. Thus, growing a given cGANe with ten additional DCGANs took ~21.5 hours on average. The training of the validation model for each fold took ~3.5 hours. The network training was performed using four parallel processing NVIDIA 1080ti graphics cards, having 11 GB RAM each.

Ablation Study: Unconstrained Ensembles

To quantify the impact SFD based ensemble growth constraint, we performed the validation study for ensembles that grew without it (GANe); each newly trained DCGAN was added into the ensemble without verifying their output's statistical distribution via SFD. The summary for the results of this experiment is provided in Table 6 (FIG. 22).

Visualizing the Ensemble Information Coverage

Figure 20:
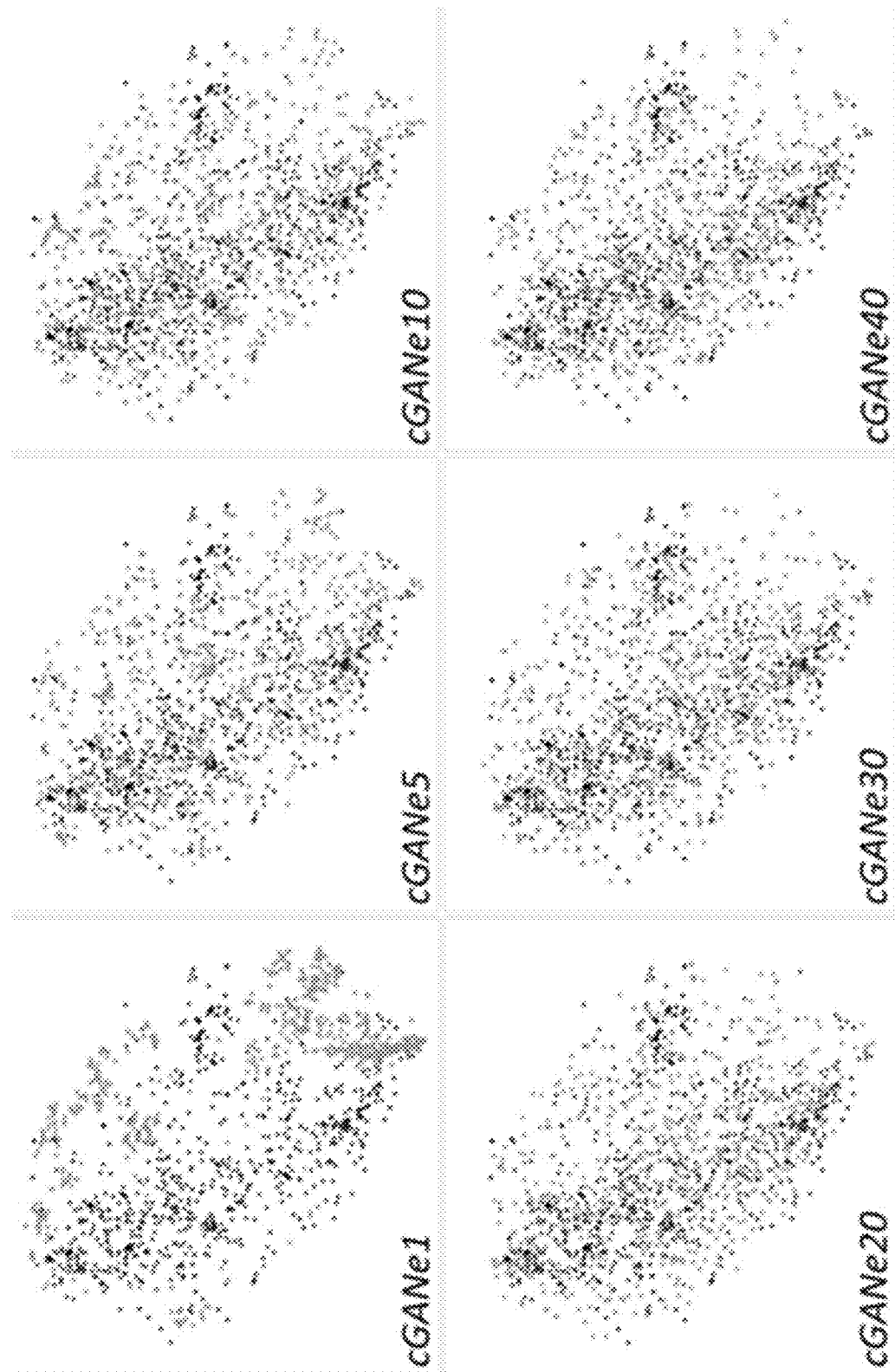
FIG. 20 are t-SNE representations for real (black) and cGANe generated (orange) data samples.

As described previously, a potential problem with the usage of a single GAN is the partial representation of the real data PDF. The issue and the validity of our solution was further illustrated by performing a low dimensional data embedding analysis (see FIG. 20): The real data (i.e., all 932 BMs) and the matching number of cGANe generated synthetic samples were visualized via two-dimensional embeddings, generated by (1) reducing the flattened 4096-dimensional volumetric data into 80-dimensional data using principal component analysis (PCA)[38], explaining ~84.5 percent of the data variance, and (2) embedding these 80-dimensional representations into two dimensions using t-Distributed Stochastic Neighbor Embedding (t-SNE)[39]. (The mapping of very high dimensional data into highly representative lower-dimensional data prior to t-SNE was suggested in [39]). As shown in the cGANe1 plot, the usage of a single constrained DCGAN caused the lower-dimensional mappings to accumulate in regions that do not align well with the original data. The misrepresentation declined with the cGANe scale, where the cGAN(e≥10) plots have better real and synthetic data mixtures; explaining the improved validation model performances of cGANe settings with higher numbers of components.

Discussion and Conclusion

The validation study showed that the synthetic data generated by a constrained ensemble of 40 DCGANs (cGANe40) can be used for training a BM-detection model successfully: The model trained using the dataset generated by cGANe40 produced 9.53 false-positives for 90 percent detection sensitivity. The result is comparable with the 9.12 false-positives for the same sensitivity level produced using the original data for the model training (see FIGS. 18A-18H and Table 5). Accordingly, the ensemble can be utilized for producing positive synthetic data samples for client sites intending to (1) reproduce the results with the same BM-detection model, or (2) use it for performing another research with this specific data type (i.e., volumetric BM region data for T1-weighted contrast-enhanced MRI examinations).

The ablation study was performed to present the impact of SFD based ensemble member constraint on final performance. As shown in Table 6, the elimination of this constraint led to a BM-detection performance that is significantly worse than the original performance; using the data produced by an unconstrained ensemble with 40 members (GANe40) caused ~16 false-positives for 90 percent detection sensitivity.

The visual resemblance test was shown to eliminate synthetic samples (see FIGS. 19A-19B) that closely resemble the originals. The technique can be further validated in a future study for modalities in which the patient could be identified from the medical images (i.e., full head CT). This may also require the geometric transformation component of Equation-13 (i.e., T(.)) to be adapted for non-rigid transformations.

The framework currently holds various parameters (e.g., the GAN type, acceptable performance gap, visual resemblance test threshold, etc.), which were set empirically for the given case study. Future studies may benefit from the provided values as a starting point; yet, they need to be determined for each novel synthetic data generation application.

A limitation of the introduced framework is its computational efficiency. For the given case study, a given constrained ensemble grew with ten additional members in ~21.5 hours; hence, the cGANe40 computation took ~86 hours (for a single fold). After the completion of the constrained ensemble, the synthetic data then can be generated in magnitudes of thousands in a few seconds (i.e., 2000 synthetic volumes are generated in ~14 seconds).

The study introduced the constrained ensemble of GANs, formulated to generate synthetic datasets that are research worthy and do not contain samples closely resembling the original data. The solution includes the (1) objective oriented ensemble growth strategy, (2) SFD constraint for ensemble members, and (3) visual resemblance metric. The case study presented the applicability of the proposed solution by generating BM region volumes, where replacing the original data with the synthetic ones during the model training led to acceptable performance during the model testing.

Example 3

As noted above, candidate point selection (see e.g., FIG. 24, step 2404) using an LoG approach is a CPU-intensive technique. As an alternative, a CNN can be used to determine the plurality of candidate points in the image (see e.g., FIG. 24, step 2404).

A candidate detection CNN (cdCNN) that processes the volumetric data in a fraction of the time required by the constrained LoG is described below. The input for the cdCNN is isotropically sampled 3D MRI data with each voxel representing 1 mm$^3$. The output is a single channel volumetric data with the same dimensions as the input. The network architecture consists of a stack of dimension-preserving three-channel convolutional blocks; the network's depth d is determined based on the target rf:

$$rf = k + (d-1)*(k-1), \quad (15)$$

where d gives the number of sequential convolutional blocks with kernel sizes of k (Araujo, A., 2019).

The input-output pairs for the cdCNN training are prepared as follows: (1) LoG(p,V) is computed for the input V after finding p, and (2) the corresponding non-smoothed output Q (having the same dimensions as V) is set as, $$Q(x) = \begin{cases} 0 & x \notin LoG(p, V) \\ c \leq 1 & x \in LoG(p, V) \\ 1 & x \in M(V) \end{cases} \quad (16)$$

where (1) x denotes a 3D voxel coordinate, and (2) c is a hyperparameter giving the voxel value for a point that is a candidate point but not a BM center position. Sigmoid activation is used at the output layer to present this [0,1] range output. Note that Q is a sparse matrix (i.e., ~99.5% of Q is zeros); hence, the Dice similarity coefficient is chosen as the loss function during the training with a Gaussian smoothed version of the output (i.e., R=N(Q, $\sigma_{smooth}$)) to facilitate convergence.

The conversion of the cdCNN output to a list of 3D points (as the constrained LoG produces) requires the thresholding of the output. The optimal threshold value (T) is determined by optimizing:

$$\arg\max_{\tau, Sv \geq \theta}(Sv(cdCNN(V) > \tau, M)), \quad (17)$$

$$\arg\min_{\tau}(|cdCNN(V) > \tau|), \quad (18)$$

where cdCNN(V)>τ is used as a shorthand notation for the list of 3D points in cdCNN output that are larger than T. More explicitly, Eqn. (17) maximizes the BM detection sensitivity, whereas Eqn. (18) minimizes the length of the BM candidates list generated by cdCNN.

A trained cdCNN for candidate point selection is used in tandem with the classification network (see e.g., FIG. 5, CropNet-b2-16 mm, Example 1) to form a BM detection framework. The CropNet network architecture is adapted such that the isotropically sampled input represents a 16 mm×16 mm×16 mm region and produces a binary output giving the BM likelihood probability. It is trained using batches of paired positive and negative samples presenting volumetric regions centered by the correct BM positions, and cdCNN generated candidates that are not BM centers (i.e., away from an actual BM center at least 2 mm) respectively. The trained cdCNN and CropNet are deployed in an augmented fashion; the BM candidates generated by cdCNN are fed into CropNet using an iterator for the final BM detections.

References—Example 1

[1] L. Nayak, E. Q. Lee, and P. Y. Wen, "Epidemiology of brain metastases," Curr. Oncol. Rep., vol. 14, no. 1, pp. 48-54, 2012.

[2] B. C. Yoon, A. F. Saad, P. Rezaii, M. Wintermark, G. Zaharchuk, and M. Iv, "Evaluation of Thick-Slab Overlapping MIP Images of Contrast-Enhanced 3D T1-Weighted CUBE for Detection of Intracranial Metastases: A Pilot Study for Comparison of Lesion Detection, Interpretation Time, and Sensitivity with Nonoverlapping CUBE MIP, CUBE, a," Am. J. Neuroradiol., vol. 39, no. 9, pp. 1635-1642, 2018.

[3] U. Perez-Ramirez, E. Arana, and D. Moratal, "Computer-aided detection of brain metastases using a three-dimensional template-based matching algorithm," in Proc. Annu. Int. Conf. IEEE Eng. Med. Biol. Soc., 2014, pp. 2384-2387.

[4] R. D. Ambrosini, P. Wang, and W. G. O'dell, "Computer-aided detection of metastatic brain tumors using automated three-dimensional template matching," J. Magn. Reson. Imaging, vol. 31, no. 1, pp. 85-93, 2010.

[5] R. Farjam, H. A. Parmar, D. C. Noll, C. I. Tsien, and Y. Cao, "An approach for computer-aided detection of brain metastases in post-Gd T1-W MRI," Magn. Reson. Imaging, vol. 30, no. 6, pp. 824-836, 2012.

[6] S. Yang, Y. Nam, M.-O. Kim, E. Y. Kim, J. Park, and D.-H. Kim, "Computer-aided detection of metastatic brain tumors using magnetic resonance black-blood imaging," Invest. Radiol., vol. 48, no. 2, pp. 113-119, 2013.

[7] H. Khotanlou, O. Colliot, J. Atif, and I. Bloch, "3D brain tumor segmentation in MRI using fuzzy classification, symmetry analysis and spatially constrained deformable models," Fuzzy Sets Syst., vol. 160, no. 10, pp. 1457-1473, 2009.

[8] D. Dera, N. Bouaynaya, and H. M. Fathallah-Shaykh, "Automated robust image segmentation: Level set method using nonnegative matrix factorization with application to brain MRI," Bull. Math. Biol., vol. 78, no. 7, pp. 1450-1476, 2016.

[9] T. Sugimoto, S. Katsuragawa, T. Hirai, R. Murakami, and Y. Yamashita, "Computerized detection of metastatic brain tumors on contrast-enhanced 3D MR images by using a selective enhancement filter," in Proc. World Congr. Med. Phys. Biomed. Eng., 2009, pp. 2070-2072.

[10] Y. LeCun, L. Bottou, Y. Bengio, P. Haffner, and others, "Gradient-based learning applied to document recognition," Proc. IEEE, vol. 86, no. 11, pp. 2278-2324, 1998.

[11] S. Bakas et al., "Identifying the best machine learning algorithms for brain tumor segmentation, progression assessment, and overall survival prediction in the BRATS challenge," arXiv Prepr. arXiv1811.02629, 2018.

[12] G. Litjens et al., "A Survey on Deep Learning in Medical Image Analysis," Med. Image Anal., vol. 42, 2017.

[13] M. Losch, "Detection and segmentation of brain metastases with deep convolutional networks," M. S. thesis, KTH, Computer Vision and Active Perception, CVAP, 2015.

[14] O. Charron, A. Lallement, D. Jarnet, V. Noblet, J.-B. Clavier, and P. Meyer, "Automatic detection and segmentation of brain metastases on multimodal MR images with a deep convolutional neural network," Comput. Biol. Med., vol. 95, 2018.

[15] K. Kamnitsas et al., "Efficient multi-scale 3D CNN with fully connected CRF for accurate brain lesion segmentation," Med. Image Anal., vol. 36, pp. 61-78, 2017.

[16] Y. Liu et al., "A deep convolutional neural network-based automatic delineation strategy for multiple brain metastases stereotactic radiosurgery," PLoS One, vol. 12, no. 10, p. e0185844, 2017.

[17] B. H. Menze et al., "The multimodal brain tumor image segmentation benchmark (BRATS)," IEEE Trans. Med. Imaging, vol. 34, no. 10, pp. 1993-2024, 2014.

[18] E. Grøvik, D. Yi, M. Iv, E. Tong, D. L. Rubin, and G. Zaharchuk, "Deep learning enables automatic detection and segmentation of brain metastases on multi-sequence MRI," arXiv Prepr. arXiv1903.07988, 2019.

[19] C. Szegedy et al., "Going deeper with convolutions," in The IEEE Conference on Computer Vision and Pattern Recognition (CVPR), 2015, pp. 1-9.

[20] E. McTyre, J. Scott, and P. Chinnaiyan, "Whole brain radiotherapy for brain metastasis," Surg. Neurol. Int., vol. 4, no. Suppl 4, p. S236, 2013.

[21] T. Lindeberg, "Image matching using generalized scale-space interest points," J. Math. Imaging Vis., vol. 52, no. 1, pp. 3-36, 2015.

[22] T. Lindeberg, "Scale selection properties of generalized scale-space interest point detectors," J. Math. Imaging Vis., vol. 46, no. 2, pp. 177-210, 2013.

[23] C.-P. Yu, G. Ruppert, R. Collins, D. Nguyen, A. Falcao, and Y. Liu, "3D blob based brain tumor detection and segmentation in MR images," in Proc. IEEE 11th Int. Symp. Biomed. Imag., 2014, pp. 1192-1197.

[24] S. Wang and R. M. Summers, "Machine learning and radiology," Med. Image Anal., vol. 16, no. 5, pp. 933-951, 2012.

[25] F. Milletari, N. Navab, and S.-A. Ahmadi, "V-Net: Fully Convolutional Neural Networks for Volumetric Medical Image Segmentation," 2016, pp. 565-571.

[26] A. Dosovitskiy, P. Fischer, J. T. Springenberg, M. Riedmiller, and T. Brox, "Discriminative unsupervised feature learning with exemplar convolutional neural networks," IEEE Trans. Pattern Anal. Mach. Intell., vol. 38, no. 9, pp. 1734-1747, 2015.

[27] O. Ronneberger, P. Fischer, and T. Brox, "U-net: Convolutional networks for biomedical image segmentation," in Proc. Int. Conf. Med. Image Comput. Comput.-Assisted Intervent., 2015, pp. 234-241.

[28] X. Yang et al., "Co-trained convolutional neural networks for automated detection of prostate cancer in multi-parametric MRI," Med. Image Anal., vol. 42, pp. 212-227, 2017.

[29] J. Duchon, "Splines minimizing rotation-invariant semi-norms in Sobolev spaces," in Constructive theory of functions of several variables, Springer, 1977, pp. 85-100.

[30] M. H. Le et al., "Automated diagnosis of prostate cancer in multi-parametric MRI based on multimodal convolutional neural networks," Phys. Med. Biol., vol. 62, no. 16, p. 6497, 2017.

[31] P. Y. Simard, D. Steinkraus, and J. C. Platt, "Best practices for convolutional neural networks applied to visual document analysis," in Seventh International Conference on Document Analysis and Recognition, 2003. Proceedings., 2003, vol. 1, pp. 958-963.

[32] N. Robitaille, A. Mouiha, B. Crépeault, F. Valdivia, and S. Duchesne, "Tissue-based MRI intensity standardization: Application to multicentric datasets," J. Biomed. Imaging, vol. 2012, p. 4, 2012.

[33] M. Shah et al., "Evaluating intensity normalization on MRIs of human brain with multiple sclerosis," Med. Image Anal., vol. 15, no. 2, pp. 267-282, 2011.

[34] J. D. Christensen, "Normalization of brain magnetic resonance images using histogram even-order derivative analysis," Magn. Reson. Imaging, vol. 21, no. 7, pp. 817-820, 2003.

[35] B. M. Ellingson et al., "Comparison between intensity normalization techniques for dynamic susceptibility contrast (DSC)-MRI estimates of cerebral blood volume (CBV) in human gliomas," J. Magn. Reson. Imaging, vol. 35, no. 6, pp. 1472-1477, 2012.

[36] L. G. Nyúl, J. K. Udupa, and X. Zhang, "New variants of a method of MRI scale standardization," IEEE Trans. Med. Imaging, vol. 19, no. 2, pp. 143-150, 2000.

[37] S. Roy, A. Carass, and J. L. Prince, "Patch based intensity normalization of brain MR images," in Proc. IEEE 10th Int. Symp. Biomed. Imag., 2013, pp. 342-345.

[38] A. Galdran et al., "Data-driven color augmentation techniques for deep skin image analysis," arXiv Prepr. arXiv1703.03702, 2017.

[39] X. Glorot and Y. Bengio, "Understanding the difficulty of training deep feedforward neural networks," in Proc. 13th Int. Conf. Artif. Intell. Statist., 2010, pp. 249-256.

[40] M. Demirer et al., "A user interface for optimizing radiologist engagement in image-data curation for artificial intelligence," Radiol. Artif. Intell. Pap. RYAI-18-0095.

[41] J. Pluim, J. Maintz, and M. Viergever, "Mutual-Information-Based Registration of Medical Images: A Survey," Med. Imaging, IEEE Trans., vol. 22, pp. 986-1004, 2003.

[42] F. Pedregosa et al., "Scikit-learn: Machine learning in Python," J. Mach. Learn. Res., vol. 12, no. October, pp. 2825-2830, 2011.

[43] D. Kingma and J. Ba, "Adam: A Method for Stochastic Optimization," Int. Conf. Learn. Represent., 2014.

[44] B. J. Erickson, P. Korfiatis, Z. Akkus, and T. L. Kline, "Machine learning for medical imaging," Radiographics, vol. 37, no. 2, pp. 505-515, 2017.

[45] J. N. van Rijn and F. Hutter, "Hyperparameter importance across datasets," in Proc. 24th ACM SIGKDD Int. Conf. Knowl. Discovery Data Mining, 2018, pp. 2367-2376.

[46] R. K. Srivastava, K. Greff, and J. Schmidhuber, "Training very deep networks," in Advances in neural information processing systems, 2015, pp. 2377-2385.

[47] K. He, X. Zhang, S. Ren, and J. Sun, "Deep residual learning for image recognition," in Proceedings of the IEEE conference on computer vision and pattern recognition, 2016, pp. 770-778.

[48] G. Huang, Z. Liu, L. Van Der Maaten, and K. Q. Weinberger, "Densely connected convolutional networks," in Proceedings of the IEEE conference on computer vision and pattern recognition, 2017, pp. 4700-4708.

[49] J. Deng, W. Dong, R. Socher, L.-J. Li, K. Li, and L. Fei-Fei, "Imagenet: A large-scale hierarchical image database," in 2009 IEEE conference on computer vision and pattern recognition, 2009, pp. 248-255.

[50] K. Weiss, T. M. Khoshgoftaar, and D. Wang, "A survey of transfer learning," J. Big data, vol. 3, no. 1, p. 9, 2016.

[51] M. H. Hesamian, W. Jia, X. He, and P. Kennedy, "Deep Learning Techniques for Medical Image Segmentation: Achievements and Challenges," J. Digit. Imaging, pp. 1-15, 2019.

[52] A. A. Taha and A. Hanbury, "Metrics for evaluating 3D medical image segmentation: Analysis, selection, and tool," BMC Med. Imaging, vol. 15, no. 1, p. 29, 2015.

[53] T. Hastie, R. Tibshirani, and J. Friedman, "Kernel Density Estimation and Classification," in The elements of statistical learning: Data mining, inference, and prediction, Springer, 2009, pp. 208-212.

References—Example 2

[1]. W. Liu et al., "A survey of deep neural network architectures and their applications," Neurocomputing 234, 11-26, Elsevier (2017) [doi:10.1016/j.neucom.2016.12.038].

[2]. G. Litjens et al., "A Survey on Deep Learning in Medical Image Analysis," Med. Image Anal. 42 (2017) [doi:10.1016/j.media.2017.07.005].

[3]. D. Shen, G. Wu, and H.-I. Suk, "Deep learning in medical image analysis," Annu. Rev. Biomed. Eng. 19, 221-248, Annual Reviews (2017) [doi:doi:10.1146/annurev-bioeng-071516-044442].

[4]. V. Sze et al., "Efficient processing of deep neural networks: A tutorial and survey," Proc. IEEE 105(12), 2295-2329, Ieee (2017) [doi:10.1109/JPROC.2017.2761740].

[5]. S. Nass, L. Levit, and L. Gostin, Beyond the HIPAA Privacy Rule: Enhancing Privacy, Improving Health Through Research, in Beyond the HIPAA Privacy Rule: Enhancing Privacy, Improving Health Through Research, The National Academies Press, Washington, DC (2009) [doi:10.17226/12458].

[6]. R. C. Petersen et al., "Alzheimer's disease neuroimaging initiative (ADNI): clinical characterization," Neurology 74(3), 201-209, Lippincott Williams and Wilkins (2010) [doi:10.1212/WNL.0b013e3181cb3e25].

[7]. L. Oakden-Rayner, "Exploring Large-scale Public Medical Image Datasets," Acad. Radiol. 27(1), 106-112, Elsevier (2019) [doi:10.1016/j.acra.2019.10.006].

[8]. K. Clark et al., "The Cancer Imaging Archive (TCIA): maintaining and operating a public information repository," J. Digit. Imaging 26(6), 1045-1057, Springer (2013) [doi:10.1007/510278-013-9622-7].

[9]. P. Dluhos et al., "Multi-center Machine Learning in Imaging Psychiatry: A Meta-Model Approach," Neuroimage 155 (2017) [doi:10.1016/j.neuroimage.2017.03.027].

[10]. I. Goodfellow et al., "Generative Adversarial Networks," Adv. Neural Inf. Process. Syst. 3 (2014).

[11]. E. Tzeng et al., "Adversarial discriminative domain adaptation," in Proceedings of the IEEE Conference on Computer Vision and Pattern Recognition, pp. 7167-7176 (2017) [doi:10.1109/CVPR.2017.316].

[12]. M. Frid-Adar et al., "GAN-based Synthetic Medical Image Augmentation for increased CNN Performance in Liver Lesion Classification," Neurocomputing (2018) [doi:10.1016/j.neucom.2018.09.013].

[13]. C. Bowles et al., "GAN augmentation: augmenting training data using generative adversarial networks," arXiv Prepr. arXiv1810.10863 (2018).

[14]. C. Han et al., "Combining Noise-to-Image and Image-to-Image GANs: Brain MR Image Augmentation for Tumor Detection," IEEE Access 7, 1 (2019) [doi:10.1109/ACCESS.2019.2947606].

[15]. A. Madani et al., "Semi-supervised learning with generative adversarial networks for chest X-ray classification with ability of data domain adaptation," 2018, 1038-1042 [doi:10.1109/ISB1.2018.8363749].

[16]. H. Salehinejad et al., "Generalization of Deep Neural Networks for Chest Pathology Classification in X-Rays Using Generative Adversarial Networks," 2018 [doi:10.1109/ICASSP.2018.8461430].

[17]. R. Arandjelovi6 and A. Zisserman, "Object discovery with a copy-pasting gan," arXiv Prepr. arXiv1905.11369 (2019).

[18]. D. Lee et al., "Context-Aware Synthesis and Placement of Object Instances," in Proceedings of the 32nd International Conference on Neural Information Processing Systems, pp. 10414-10424, Curran Associates Inc., Red Hook, NY, USA (2018) [doi:doi:10.5555/3327546.3327701].

[19]. Y. Wang, L. Zhang, and J. Van De Weijer, "Ensembles of generative adversarial networks," arXiv Prepr. arXiv1612.00991 (2016).

[20]. E. Dikici et al., "Automated Brain Metastases Detection Framework for T1-Weighted Contrast-Enhanced 3D MRI," IEEE J. Biomed. Heal. Informatics, 1 (2020) [doi:10.1109/JBHI.2020.2982103].

[21]. X. Wu, K. Xu, and P. Hall, "A survey of image synthesis and editing with generative adversarial networks," Tsinghua Sci. Technol. 22(6), 660-674 (2017) [doi:10.23919/TST.2017.8195348].

[22]. Z. Pan et al., "Recent Progress on Generative Adversarial Networks (GANs): A Survey," IEEE Access PP, 1 (2019) [doi:10.1109/ACCESS.2019.2905015].

[23]. X. Yi, E. Walia, and P. Babyn, "Generative Adversarial Network in Medical Imaging: A Review," Med. Image Anal. 58, 101552 (2019) [doi:10.1016/j.media.2019.101552].

[24]. X. Wang and A. Gupta, "Unsupervised Learning of Visual Representations Using Videos," in 2015 IEEE International Conference on Computer Vision (ICCV), pp. 2794-2802 (2015) [doi:10.1109/ICCV.2015.320].

[25]. R. F. Woolson, "Wilcoxon Signed-Rank Test," in Wiley Encyclopedia of Clinical Trials, pp. 1-3, American Cancer Society (2008) [doi:10.1002/9780471462422.eoct979].

[26]. R. Polikar, "Ensemble based systems in decision making," IEEE Circuits Syst. Mag. 6(3), 21-45, IEEE (2006) [doi:10.1109/MCAS.2006.1688199].

[27]. 0. Sagi and L. Rokach, "Ensemble learning: A survey," Wiley Interdiscip. Rev. Data Min. Knowl. Discov. 8(4), e1249, Wiley Online Library (2018) [doi:10.1002/widm.1249].

[28]. L. Theis, A. van den Oord, and M. Bethge, "A note on the evaluation of generative models," in International Conference on Learning Representations (2016).

[29]. D. Geman et al., "Visual Turing test for computer vision systems," Proc. Natl. Acad. Sci. U.S.A 112 (2015) [doi:10.1073/pnas.1422953112].

[30]. M. Heusel et al., "GANs trained by a two time-scale update rule converge to a local Nash equilibrium," in Advances in Neural Information Processing Systems 2017-Decem, pp. 6627-6638 (2017) [doi:10.5555/3295222.3295408].

[31]. C. Szegedy et al., "Going deeper with convolutions," in The IEEE Conference on Computer Vision and Pattern Recognition (CVPR), pp. 1-9 (2015) [doi:10.1109/CVPR.2015.7298594].

[32]. K. Shmelkov, C. Schmid, and K. Alahari, "How good is my GAN?," in The European Conference on Computer Vision (ECCV) (2018).

[33]. J. Deng et al., "Imagenet: A large-scale hierarchical image database," in 2009 IEEE conference on computer vision and pattern recognition, pp. 248-255 (2009).

[34]. A. Radford, L. Metz, and S. Chintala, "Unsupervised representation learning with deep convolutional generative adversarial networks," arXiv Prepr. arXiv1511.06434 (2015).

[35]. M. J. M. Chuquicusma et al., "How to fool radiologists with generative adversarial networks? a visual turing test for lung cancer diagnosis," in 2018 IEEE 15th international symposium on biomedical imaging (ISBI 2018), pp. 240-244 (2018).

[36]. A. Plassard et al., "Learning Implicit Brain MRI Manifolds with Deep Learning," in Proceedings of SPIE—the International Society for Optical Engineering 10574, p. 56 (2018) [doi:10.1117/12.2293515].

[37]. D. Kingma and J. Ba, "Adam: A Method for Stochastic Optimization," Int. Conf. Learn. Represent. (2014).

[38]. T. Hastie, R. Tibshirani, and J. Friedman, "Linear Methods for Regression," in The elements of statistical learning: Data mining, inference, and prediction, pp. 43-94, Springer (2009).

[39]. L. van der Maaten and G. Hinton, "Visualizing data using t-SNE," J. Mach. Learn. Res. 9, 2579-2605 (2008).

References—Example 3

Araujo, A., Norris, W., Sim, J., 2019. Computing receptive fields of convolutional neural networks. Distill 4, e21.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for lesion detection, comprising:
at least one processor;
a memory operably coupled to the at least one processor, the memory having computer-executable instructions stored thereon;
a candidate selection module stored in the memory that, when executed by the at least one processor, is configured to:
receive an image,
determine a plurality of candidate points in the image using a Laplacian of Gaussian (LoG) approach with sensitivity constraint, wherein the sensitivity constraint is selected such that a desired percentage of actual lesions having a volume less than 500 $mm^3$ are detected as candidate points, and
select a respective volumetric region centered by each of the candidate points, wherein one or more of the respective volumetric regions contain lesions having a volume of less than 500 $mm^3$; and
a deep learning network configured to:
receive the respective volumetric regions selected by the candidate selection module, and
determine a respective probability of each respective volumetric region to contain a lesion.

2. The system of claim 1, wherein the deep learning network is further configured to classify each respective volumetric region as a positive or negative lesion candidate based on its respective probability to contain the lesion.

3. The system of claim 2, further comprising an image annotation module stored in the memory that, when executed by the at least one processor, is configured to provide an annotation to highlight within the image a volumetric region classified as the positive lesion candidate.

4. The system of claim 3, further comprising a display device, wherein the display device is configured to display the image and the annotation.

5. The system of claim 1, wherein the deep learning network is a convolutional neural network (CNN).

6. The system of claim 1, wherein the volumetric region is a 16 millimeter (mm)×16 mm×16 mm region, a 32 mm×32 mm×32 mm region, or a 64 mm×64 mm×64 mm region.

7. The system of claim 1, wherein the image is a magnetic resonance imaging (MRI) image, a computed tomography (CT) image, a positron emission tomography (PET)-CT image, a three-dimensional (3D) mammography image, or a 3D ultrasound image.

8. The system of claim 1, wherein the lesion is a brain metastatic (BM) lesion.

9. A computer-implemented method for lesion detection, comprising:
receiving an image;
determining a plurality of candidate points in the image using a Laplacian of Gaussian (LoG) approach with sensitivity constraint, wherein the sensitivity constraint is selected such that a desired percentage of actual lesions having a volume less than about 500 mm³ are detected as candidate points;

selecting a respective volumetric region centered by each of the candidate points, wherein one or more of the respective volumetric regions contain lesions having a volume of less than 500 mm³;

inputting each respective volumetric region into a deep learning network; and determining, using the deep learning network, a respective probability of each respective volumetric region to contain a lesion.

10. The computer-implemented method of claim 9, wherein the deep learning network is a convolutional neural network (CNN).

11. The computer-implemented method of claim 9, further comprising:

classifying each respective volumetric region as a positive or negative lesion candidate based on its respective probability to contain the lesion;

displaying the image; and providing an annotation within the image to highlight a volumetric region classified as the positive lesion candidate.

12. The computer-implemented method of claim 9, wherein the image is a magnetic resonance imaging (MRI) image, a computed tomography (CT) image, a positron emission tomography (PET)-CT image, a three-dimensional (3D) mammography image, or a 3D ultrasound image.

* * * * *